United States Patent [19]

Abo et al.

[11] Patent Number: 4,590,561

[45] Date of Patent: May 20, 1986

[54] METHOD AND APPARATUS FOR CONTROLLING REDUCTION RATIO OF CONTINUOUSLY VARIABLE TRANSMISSION WITH ACCELERATOR PEDAL DISPLACEMENT SPEED COMPENSATION

[75] Inventors: Keiju Abo, Yokosuka; Haruyoshi Kumura, Yokohama; Hiroyuki Hirano, Yokosuka; Yoshikazu Tanaka, Yokohama; Sigeaki Yamamuro, Zushi; Yoshiro Morimoto, Yokosuka, all of Japan

[73] Assignee: Nissan Motor Co., Ltd., Yokohama, Japan

[21] Appl. No.: 486,550

[22] Filed: Apr. 19, 1983

[30] Foreign Application Priority Data

Apr. 19, 1982 [JP] Japan ............................. 57-63868
Apr. 30, 1982 [JP] Japan ............................. 57-71511
May 20, 1982 [JP] Japan ............................. 57-83927

[51] Int. Cl.$^4$ ........................ B60K 41/08; F16H 9/18; F16H 11/06; G05D 17/02
[52] U.S. Cl. ........................ 364/424.1; 74/866; 474/16
[58] Field of Search ............... 364/424.1; 74/857, 866, 74/867; 474/12, 18, 28

[56] References Cited

U.S. PATENT DOCUMENTS

| | | | |
|---|---|---|---|
| 3,893,344 | 7/1975 | Dantlgraber et al. | 74/867 X |
| 4,161,894 | 7/1979 | Giacosa | 74/863 X |
| 4,387,608 | 6/1983 | Mohl et al. | 74/866 |
| 4,419,910 | 12/1983 | Miki et al. | 74/867 |
| 4,458,318 | 7/1984 | Smit et al. | 364/424.1 |
| 4,458,560 | 7/1984 | Frank et al. | 74/866 X |
| 4,459,879 | 7/1984 | Miki et al. | 74/867 |
| 4,462,275 | 7/1984 | Mohl et al. | 364/424.1 X |
| 4,466,521 | 8/1984 | Hattori et al. | 74/866 X |
| 4,470,117 | 9/1984 | Miki et al. | 364/424.1 |
| 4,490,790 | 12/1984 | Shinoda | 364/424.1 |

FOREIGN PATENT DOCUMENTS 0059426  9/1982  European Pat. Off. ............. 74/856

Primary Examiner—Felix D. Gruber
Attorney, Agent, or Firm—Schwartz, Jeffery, Schwaab, Mack, Blumenthal & Evans

[57] ABSTRACT

A method and an apparatus controls a reduction ratio of a continuously variable transmission of an automotive vehicle, wherein the reduction ratio is increased when the depression degree of the accelerator pedal is increased rapidly for ensuring quick acceleration. When the depression degree of the accelerator pedal is decreased rapidly, the reduction ratio is held for a predetermined period of time. Under this condition, the reduction ratio may be controlled to accomplish a predetermined deceleration.

49 Claims, 38 Drawing Figures

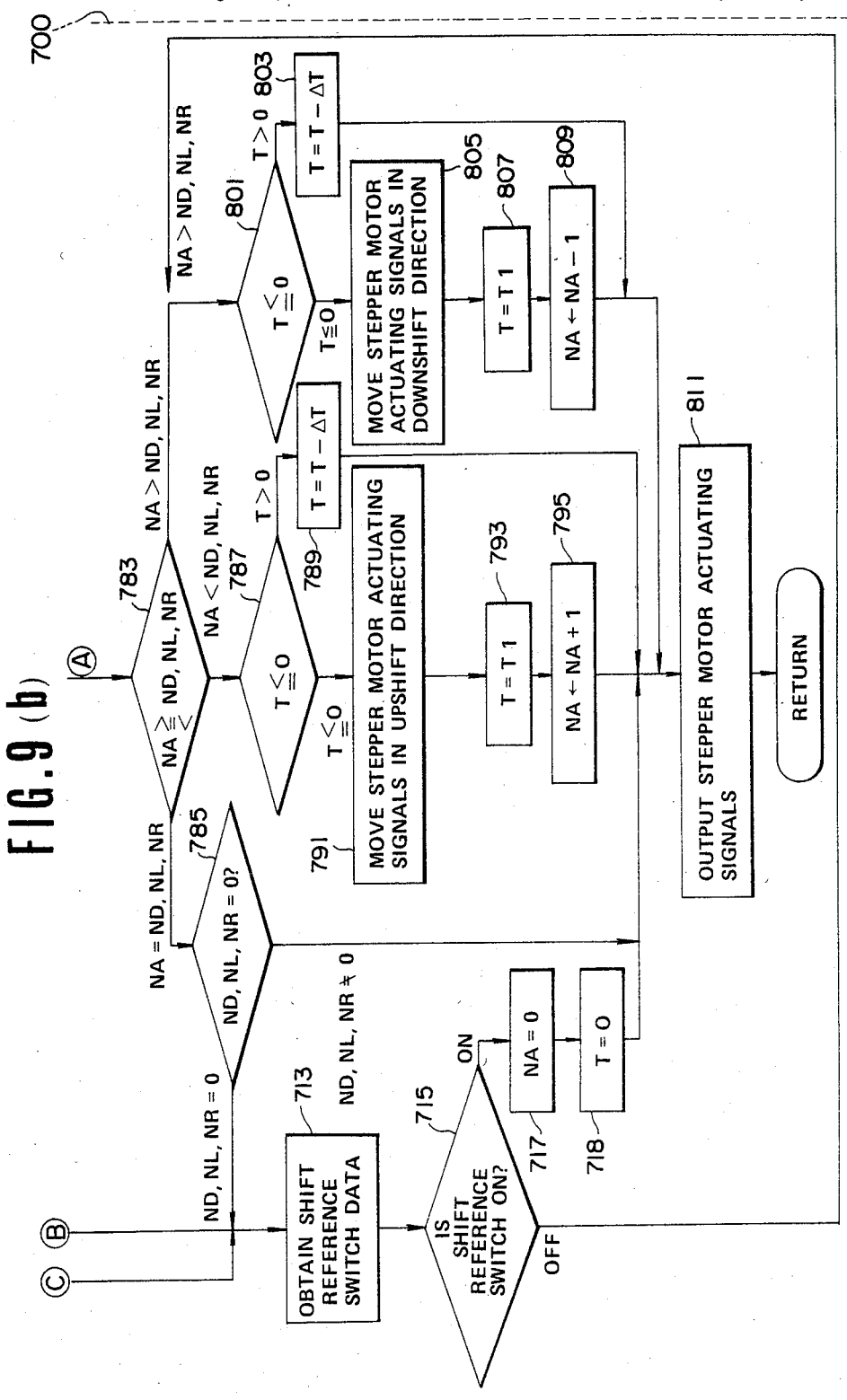

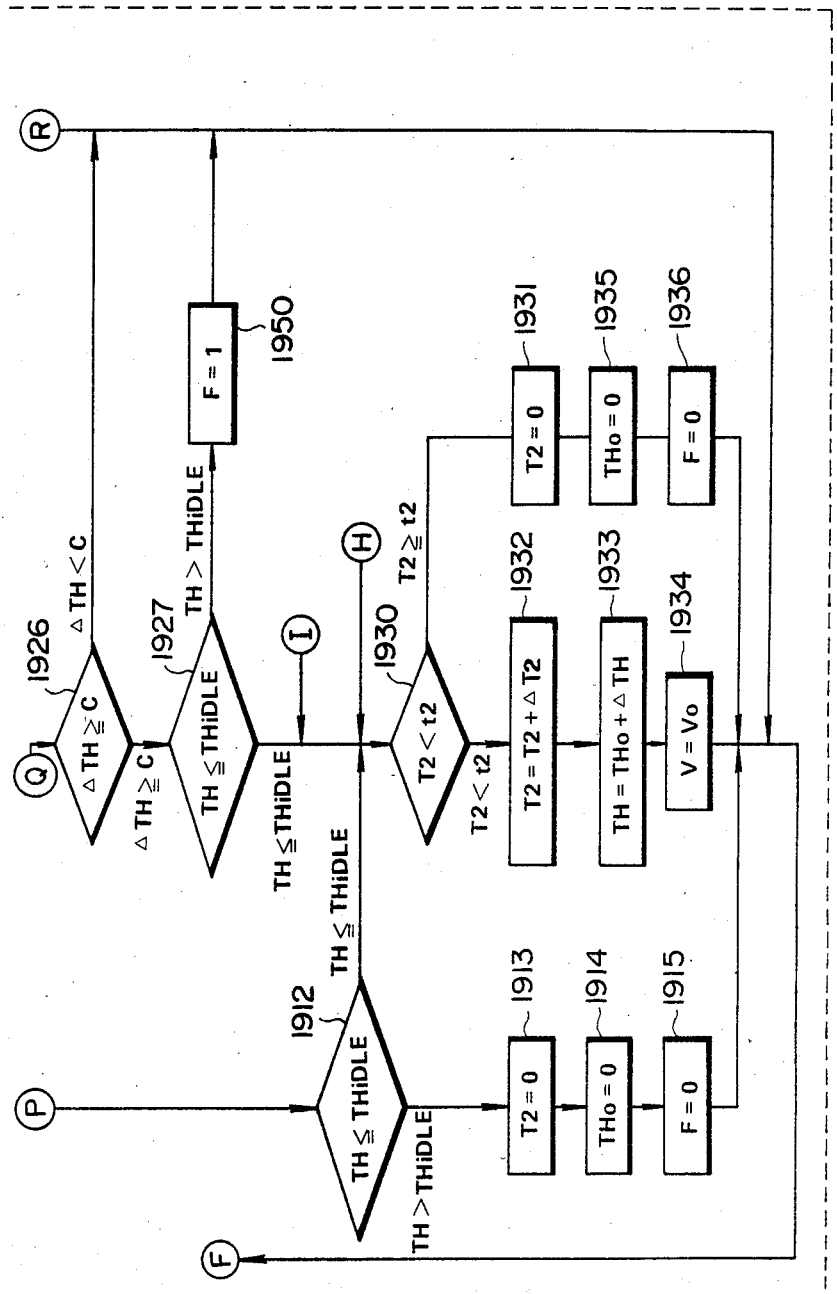

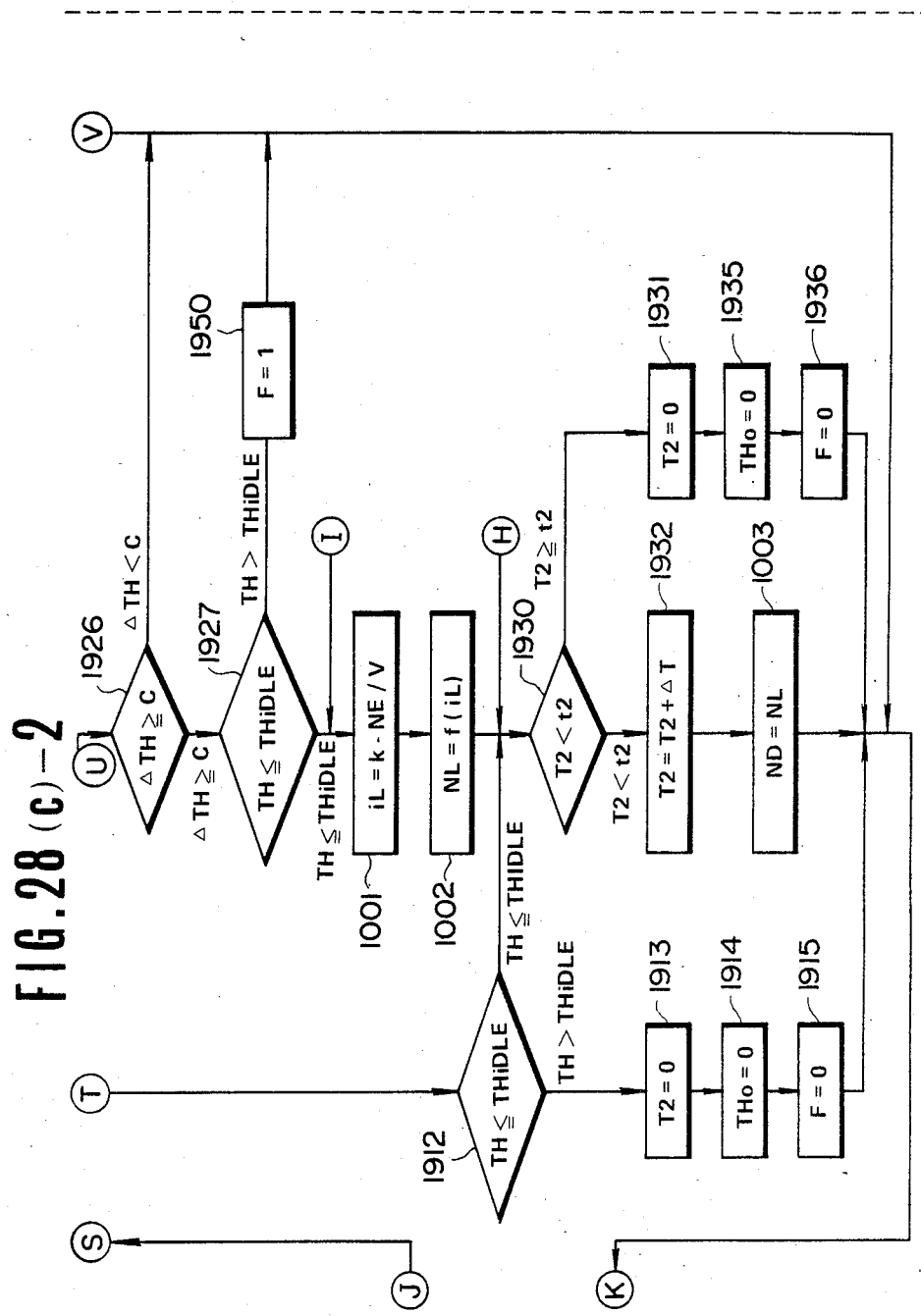

METHOD AND APPARATUS FOR CONTROLLING REDUCTION RATIO OF CONTINUOUSLY VARIABLE TRANSMISSION WITH ACCELERATOR PEDAL DISPLACEMENT SPEED COMPENSATION

BACKGROUND OF THE INVENTION

1. Field of the Invention

The present invention relates to a method and an apparatus for controlling a reduction ratio of a continuously variable transmission of an automotive vehicle.

2. Description of the Prior Art

In a known continuously variable transmission disclosed in Japanese patent application provisional publication No. 56-46153 which appears to correspond to British Patent Application provisional publication GB No. 2,058,256A, the revolution speed of a drive pulley and the engine throttle opening degree (or the engine manifold vacuum) are detected to determine an actual engine operating condition, then the actual engine operating condition is compared with a predetermined ideal engine operating condition determined in accordance with a predetermined shift pattern to provide a deviation therebetween, and then the reduction ratio is controlled to decrease the deviation therebetween.

SUMMARY OF THE INVENTION

An object of the present invention is to provide a method and an apparatus for controlling a reduction ratio of a continuously variable transmission of an automotive vehicle wherein normally the reduction ratio is controlled based on a predetermined schedule, while the reduction ratio is shifted from a reduction ratio determined by the predetermined schedule in response to at least the displacement speed of the accelerator pedal.

A particular object of the present invention is to provide a method and an apparatus for controlling a reduction ratio of a continuously variable transmission wherein the reduction ratio is increased when the depression degree of the accelerator pedal is increased rapidly, thus ensuring quick acceleration.

Another particular object of the present invention is to provide a method and an apparatus for controlling a reduction ratio of a continuously variable transmission wherein, when the depression degree of the accelerator pedal is decreased rapidly, the reduction ratio is held for a predetermined period of time, thus ensuring effective engine braking.

Still another object of the present invention is to provide a method and an apparatus for controlling a reduction ratio of a continuously variable transmission wherein, when the depression degree of the accelerator pedal is decreased rapidly, the reduction ratio is controlled to accomplish a predetermined deceleration.

According to the present invention there is provided a method for controlling a reduction ratio of a continuously variable transmission of an automotive vehicle having a brake pedal and an internal combustion engine with an accelerator pedal, which method comprises:

(a) generating an accelerator pedal displacement speed indicative signal representing the speed of displacement of the accelerator pedal;

(b) detecting at least one operating condition of the automotive vehicle;

(c) generating a desired optimum reduction ratio indicative signal representing a desired optimum reduction ratio for the detected operating condition of the automotive vehicle in response to at least the accelerator pedal displacement speed indicative signal, (d) adjusting the actual reduction ratio of the continuously variable transmission toward a value which agrees with the desired optimum reduction ratio represented by the desired optimum reduction ratio indicative signal; and (e) repeating the steps (a), (b), (c) and (d) until the actual reduction ratio agrees with said desired optimum reduction ratio represented by the desired optimum reduction ratio indicative signal.

According to the present invention, the method further comprises:

generating a release signal;

generating an accelerator pedal depression degree indicative signal representing the depression degree of the accelerator pedal; and holding the desired optimum reduction ratio indicative signal as long as the release signal is absent for a first predetermined period of time after an instance when the accelerator pedal displacement speed indicative signal becomes at least equal to a predetermined accelerator pedal displacement speed value and indicates that the degree of the accelerator pedal decreases and when the accelerator pedal depression degree indicative signal becomes less than a predetermined accelerator pedal depression degree value.

According to the present invention, there is provided an apparatus for controlling a reduction ratio of a continuously variable transmission of an automotive vehicle having a brake pedal and an internal combustion engine with an accelerator pedal, comprising:

means for generating an accelerator pedal displacement speed indicative signal representing the speed of displacement of the accelerator pedal;

means for detecting at least one operating condition of the automotive vehicle;

means for generating a desired optimum reduction ratio indicative signal representing a desired optimum reduction ratio for the detected operating condition of the automotive vehicle in response to at least the accelerator pedal displacement speed indicative signal, and means for adjusting the actual reduction ratio of the continuously variable transmission toward a value which agrees with the desired optimum reduction ratio represented by the desired optimum reduction ratio indicative signal.

BRIEF DESCRIPTION OF THE DRAWINGS

The present invention is more specifically described in connection with the accompanying drawings, wherein:

FIGS. 26(a) and 26(b) are a similar view to FIG. 9(c) showing a portion of a flow chart of a stepper motor control routing of a fifth embodiment according to the present invention;

FIGS. 28(a), 28(b) 28(c)-1 and 28(c)-2 illustrate a flow chart of a stepper motor control routine of a sixth embodiment according to the present invention;

DETAILED DESCRIPTION OF THE INVENTION

Referring to the accompanying drawings, the present invention is described hereinafter in connection with preferred embodiments.

Figure 1:
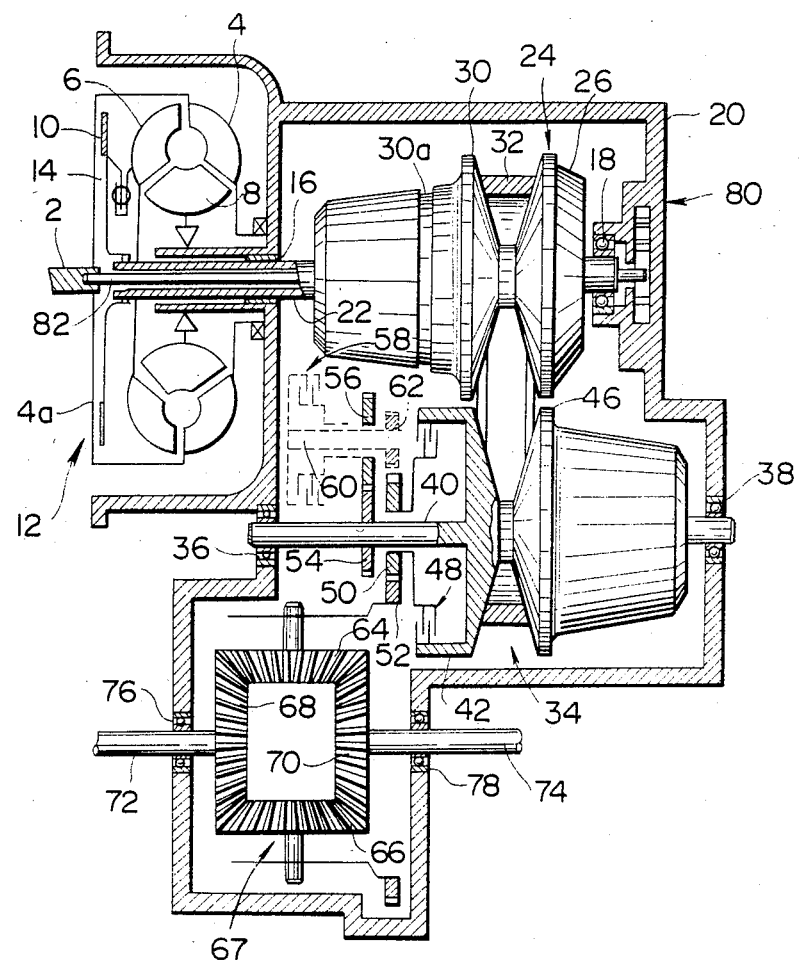
FIG. 1 is a diagrammatic cross sectional view illustrating a power transmission mechanism of a continuously variable V-belt transmission.
Figure 2:
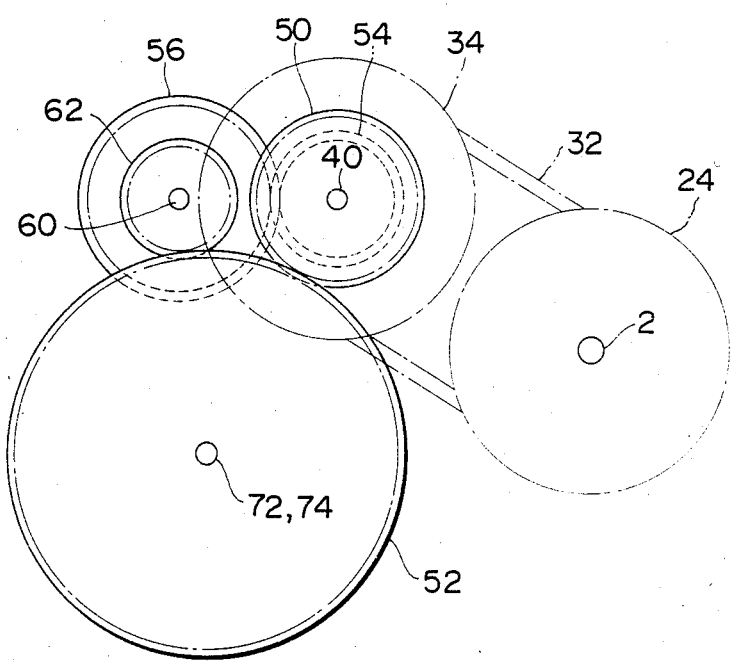
FIG. 2 is a layout of the shafts of the transmission mechanism shown in FIG. 1.

Referring to FIG. 1, a torque converter 12 (which may be replaced with a fluid coupling) includes a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14. The lock-up clutch 10 operates such that when the oil pressure within the lock-up clutch oil chamber 14 becomes lower than that within the interior of the torque converter 12, the lock-up clutch 10 is pressed against the member 4a by the pressure difference to come into unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 secured to the drive shaft 22 and an axially movable conical disc 30 which is so disposed as to face the axially fixed conical disc 26 to define a V-shaped pulley groove therebetween and which is controllably movable in an axial direction of the driven shaft 22 in response to oil pressure created within a drive pulley cylinder chamber 28 (see FIG. 3). For limiting the maximum width of the V-shaped pulley groove, an annular member 22a is fixed to the drive shaft 22 and so disposed as to engage the axial movable conical disc 30 of the drive pulley 24 (see FIG. 3). The drive pulley 24 is drivingly connected to a driven pulley 34 via a V-belt 32. The V-belt 32 runs over the drive pulley 24 and the driven pulley 34. The driven pulley 34 is arranged on a driven shaft 40 which is rotatably supported by the case 20 via the bearings 36 and 38. The driven pulley 34 comprises an axially fixed conical disc 42 secured to the driven shaft 40 and an axially movable conical disc 46 which is so disposed as to face the fixed conical disc 42 in such a manner as to define a V-shaped pulley groove and which is controllably movable in an axial direction of the driven shaft 40 in response to oil pressure created in a driven pulley cylinder chamber 44 (see FIG. 3). Similarly to the drive pulley 24, an annular member 40a is fixed to the driven shaft 40 to limit the movement of the axially slidable conical disc 46 of the driven pulley 34 so as to define the maximum width of the V-shaped pulley groove. The axially fixed conical disc 42 is drivingly connectable via a forward drive multiple disc clutch 48 to a forward drive gear 50 rotatably supported on the driven shaft 40, this forward drive gear being in mesh with a ring gear 52. Fixedly mounted to the driven shaft 40 is a reverse drive gear 54 which is in mesh with an idler gear 56. The idler gear 56 is drivingly connectable via a reverse drive multiple disc clutch 58 to an idler shaft 60 which has fixed thereto another idler gear 62 that is in mesh with the ring gear 52. In FIG. 1, the idler gear 62, idler shaft 60 and reverse drive multiple disc clutch 54 are illustrated in positions displaced from the actual positions thereof for ease of illustration, the idler gear 62 and ring gear 52 are shown as out of mesh with each other. But, they are actually in mesh with each other as shown in FIG. 2. The ring gear 52 has attached thereto a pair of pinion gears 64 and 66. A pair of axle or output shafts 72 and 74 are coupled with side gears 68 and 70, respectively, which are in mesh with the pinion gears 64 and 66 to cooperate with each other to form a differential 67. The axle shafts 72 and 74 are supported via bearings 76 and 78, respectively, and extend outwardly of the case 20 in the opposite directions and are connected to road wheels (not shown), respectively. As viewed in FIG. 1, there is arranged on the righthand side of the bearing 18 an oil pump 80 of the internally toothed gearing type which serves as a source of oil pressure, this oil pump 80 being driven by the engine output shaft 2 via an oil pump drive shaft 82 extending through the hollow driven shaft 22.

Rotary power fed from the engine output shaft 2 is transmitted via the torque converter 12, drive shaft 22, drive pulley 24, V-belt 32, driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 52 and differential 67 to the axle shafts 72 and 74 to rotate them in the forward rotational direction, whereas, in the case the reverse drive multiple disc clutch 58 is engaged with the forward drive multiple disc clutch 48 released, the rotation of the shaft 40 is transmitted via the reverse drive gear 54, idler gear 56, idler shaft 60, idler gear 62, ring gear 52 and differential 67 to the axle shafts 72 and 74 to rotate them in the reverse rotational direction. During this transmission of power, the ratio between the rotation of the drive pulley 24 and that of the driven pulley 34 may be varied by moving the axially movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 will result in a reduction in radius of the diameter of the drive pulley 24 contacting with the V-belt 32 and an increase in radius of the diameter of the driven pulley 34 contacting with the V-belt 32, resulting in an increase in reduction ratio. As a result, a reduction ratio increases. If the axially movable conical discs 30 and 46 are moved in the respective reverse directions, a reduction ratio decreases. Depending upon the situations, the torque converter serves as a torque multiplier or serves as a fluid coupling but, since it has the lock-up clutch 10 as attached to the turbine runner 6, the torque converter 12 can establish a direct mechanical connection between the engine output shaft 2 and driven shaft 22 when the lock-up clutch oil chamber 14 is drained, thus pressing the lock-up clutch 10 against the member 4a integral with the pump impeller 4.

Figure 3:
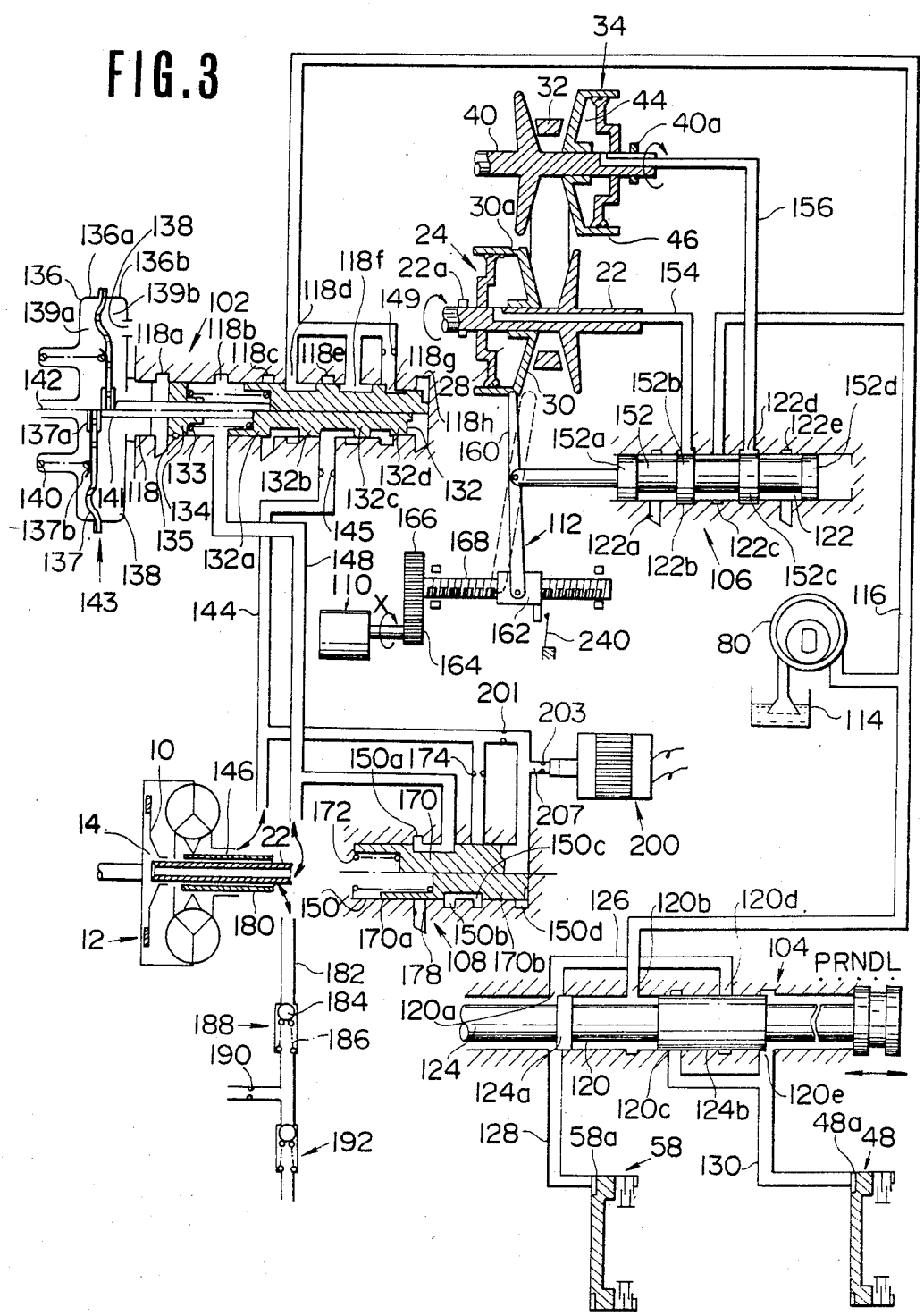
FIG. 3 is a view showing a hydraulic control system for the continuously variable V-belt transmission shown in FIGS. 1 and 2.

Referring to FIG. 3, a hydraulic control system for the continuously variable transmission is explained. As shown in FIG. 3, the control system comprises an oil pump 80, a line pressure regulator valve 102, a manual valve 104, a shift control valve 106, a lock-up valve 108, a shift motor 110, and a shift operating mechanism 112.

The oil pump 80 which is driven by the engine output shaft 2 draws off the oil from the tank 114 and discharges the oil under pressure into the oil conduit 116. The oil conduit 116 leads to ports 118e, 118f and 118g of the line pressure regulator valve 102 where the oil is regulated to generate a pressure oil under line pressure. This pressure oil is hereinafter referred to as a line pressure. The oil conduit 116 communicates with a port 120b of the manual valve 104 and a port 122c of the shift control valve 106.

The manual valve 104 has a valve bore 120 with five ports 120a, 120b, 120c, 102d and 120e, and a spool 124 having thereon two lands 124a and 124b slidably disposed in the valve bore 120. The spool 124 is actuated by a shift lever (not shown) between five detent positions or shift positions for P range, R range, N range, D range and L range. The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive the line pressure therein. When the spool 124 is set in P range, the port 120b supplied with the line pressure is covered by a land 124b, so that the cylinder chamber 58a of the reverse drive multiple disc clutch 58 and the cylinder chamber 48a of the forward drive multiple disc clutch 48 are drained via the oil conduit 126 and ports 120d and 120e. When the spool 124 is set in R range, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in N range, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is set in P range. When the spool 124 is set in D range or L range, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in P range or N range, both the forward drive multiple disc clutch 48 and the reverse drive multiple disc clutch 58 are released to interrupt the transmission of power, thus preventing the rotation of output shatfs 72 and 74. When the spool 124 is set in R range, the reverse drive multiple disc clutch 58 is engaged so as to drive the axle shafts 72 and 74 in the reverse rotational direction. When the spool 124 is set in D range or L range, the forward drive multiple disc clutch 48 is engaged so as to drive the axle shafts 72 and 74 in the forward rotational direction. Although there occurs no difference in the respect of a hydraulic circuit between the case where D range is selected and the case where L range is selected as mentioned above, both of the ranges are electrically detected to actuate the shift motor 110 in such a manner as to effect a shift control in accordance with different shift patterns.

The line pressure regulator valve 102 comprises a valve bore 118 with eight ports 118a, 118b, 118c, 118d, 118e, 118f, 118g and 118h; a spool 132 having thereon four lands 132a, 132b, 132c, and 132d, and a spring 133c disposed on the lefthand side of the spool 132; and a spring seat 134 fixed relative to the valve bore 118 by a pin 135. It is to be noted that the land 132d on the righthand end of the spool 132 is smaller in diameter than the middle lands 132a, 132b and 132c. A vacuum diaphragm 143 is arranged on the inlet of the bore 118. The vacuum diaphragm 143 is constructed of two parts 136a and 136b which clamp therebetween a diaphragm 137 and cooperate with each other to form a casing 136. The casing 136 is divided by the diaphragm 137 into two chambers 139a and 139b. Attached by a fixer 137a to the diaphragm 137 is a spring seat 137b with which a spring 140 is disposed in the chamber 139a biasing the diaphragm 137 to the right. The intake manifold vacuum is introduced into the chamber 139a via a port 142, while the other chamber 139b is vented to the atmosphere via a port 138. Arranged between the diaphragm 137 of the vacuum diaphragm 143 and the spool 132 is a rod 141 extending through the spring seat 134 so as to apply a rightwardly directed bias force to the spool 132. The arrangement is such that this bias force increases as the intake manifold vacuum decreases or becomes small. That is, if the intake manifold vacuum is small (i.e., if the intake manifold vacuum is near the atmospheric pressure), a large rightwardly directed force by the spring 140 is applied to the spool 132 through the rod 141 since a difference in pressure between the chambers 139a and 139b is small and thus the leftwardly directed force caused by this pressure difference and applied to the diaphragm 137 is small. In the reverse case where the intake manifold vacuum is large, the force applied to the spool 132 becomes small since the leftwardly directed force caused by the pressure difference between the chambers 139a and 139b becomes large and thus the rightwardly directed force by the spring 140 decreases correspondingly. The ports 118d, 118f and 118g of the line pressure regulator valve 102 are supplied with the oil under pressure from the oil pump 80, and the inlet to the port 118g is provided with an orifice 149. The ports 118a, 118c and 118h are at all times drained, and the port 118e is connected by an oil conduit 144 with the torque converter inlet port 146 and also with the ports 150c and 150d of the lock-up valve 108, and the port 118b is connected by an oil conduit 148 with the port 150b of the lock-up valve 108 and also with the lock-up clutch oil chamber 14. For preventing the application of an excessive pressure to the interior of the torque converter 12, the oil conduit 144 is provided with an orifice 145. Consequently, three forces act on the spool 132 in the rightward direction, i.e., one by the spring 133, another by the vacuum diaphragm 143 via the rod 141 and the other by the oil pressure applied to the lefthand of the land 132a via the port 118b. One force acts on the spool 132 in the leftward direction by the line pressure at the port 118g acting on differential area between the lands 132c and 132d. The spool 132 effects pressure regulation to provide the line pressure at the port 118d by adjusting the amount of drainage oil passing from the ports 118f and 118d to the respective ports 118e and 118c (i.e., first of all the oil is drained from the port 118f to the port 118e and, if more drainage is demanded, the oil is drained from the port 118d to the port 118c) until the rightwardly directed forces balance with the leftwardly directed force. As a result, the line pressure increases as the engine intake manifold vacuum drops and it increases as the oil pressure building up in the port 118b (i.e., the same pressure as in the lock-up clutch oil chamber 14) increases. Because of the oil in the oil chamber 14, the torque converter 12 is in a non lock-up state and serves as a torque multiplier. The variation in the line pressure in this manner meets the actual demands, i.e., the line pressure must be increased to increase a bracing force with which each of the pulleys 24 and 34 are biased against the V-belt 32 in response to an increase in the torque to be transmitted via the pulleys which increases as the engine load increases, i.e., as the intake manifold vacuum decreases, and besides the line pressure must be increased to increase the torque to be transmitted via the pulley as the multiplication of torque by the torque converter 12 increases.

The shift control valve 106 has a valve bore 122 with five ports 122a, 122b, 122c, 122d and 122e, and a spool 152 slidably disposed in the valve bore 122 and having thereon four lands 152a, 152b, 152c and 152d. The center port 122c communicates with the oil conduit 116 and is supplied with the line pressure, the left port 122b and the right port 122d communicate via respective conduits 154 and 156 with the drive pulley cylinder chamber 28 of the drive pulley 24 and the driven pulley cylinder chamber 44 of the driven pulley 34. Both of the end ports 122a and 122e are drained. The left end of the spool 152 is linked to a substantially middle portion of a lever 160 of the later-mentioned shift operating mechanism 112. The width of each of the lands 152b and 152c is set slightly shorter than the width of the respective ports 122b and 122d, and the distance between the lands 152b and 152c is set substantially the same as that between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. If the spool 152 is urged to move rightwardly, the reverse action to that mentioned above proceeds to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotational direction to cause the sleeve 162 to move leftwardly, the lever 160 moves in a clockwise rotational direction with its end portion received by the annular groove 30a of the axially movable conical disc 30 of the drive pulley 24 as a fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the drive pulley 34 increases, thus resulting in a decrease in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and driven pulley 34 to assume the state accomplishing a large reduction ratio. This action causes the spool 152 and the drive pulley 24 and driven pulley 34 to assume a state accomplishing a reduction ratio depending upon the amount of rotation of the shift motor 110. It goes the same if the shift motor 110 is rotated in the reverse direction. Therefore, if the shift motor 110 is actuated in accordance with a predetermined shift pattern, the reduction ratio varies accordingly, thus making it possible to control the reduction ratio in the continuously variable transmission by controlling the shift motor 110, alone.

The shift motor 110 is controlled by a control unit 300 which is described later in more detail in connection with FIG. 4.

The lock-up valve 108 comprises a valve bore 150 formed with four ports 150a, 150b, 150c and 150d, a spool 170 having two lands 170a and 170b, a spring 172 biasing the spool 170 rightwardly, and a lock-up solenoid 200 provided in the oil conduit communicating with the port 150d. The port 150a is drained. The port 150b communicates via an oil conduit 148 with the port 118b of the line pressure regulator valve 102 and also with the lock-up clutch oil chamber 14 within the torque converter 12. The ports 150c and 150d are connected with each other via an orifice 201. A branch oil conduit 207 is formed between the port 150d and the orifice 201. The branch oil conduit 207 opens via an orifice 203 and has its outlet to be closed or opened by the lock-up solenoid 200 in response to on state thereof or off state thereof. The size of the orifice 203 is greater than that of the orifice 201. When the lock-up solenoid 200 is in the on state, the spool 170 is pressed against the force of the spring 172 toward the left because the same oil pressure as that supplied to the torque converter inlet port 146 is supplied to the port 150d from the oil conduit 144 as a result of closing of the outlet of the branch oil conduit 207. In this state, the port 150c is blocked by the land 170b and the port 150b is allowed to drain toward the port 150a. As a result, the lock-up clutch oil chamber 14 which has been connected with the oil pressure via the port 150b and the oil conduit 148 is drained, allowing the lock-up clutch 10 to be engaged under the influence of the pressure in the torque converter 12, thus putting the torque converter 12 into lock-up state where the torque converter does not serve as a torque converter. In the reverse case when the lock-up solenoid 200 is put into the off state, the spool 170 is moved in the rightward direction by the righwardly directed force by the spring 172 and the port 150b is allowed to communicate with the port 150c since the oil pressure at the port 150d drops due to uncovering of the outlet of the branch oil conduit 207 (the portion of the oil conduit 144 which is subjected to this drop in pressure is confined to a portion between the orifice 201 and the port 150d, leaving the remainder of the oil conduit 144 insensitive to this pressure drop owing to the provision of the orifice 201 thus causing the force biasing the spool 170 to the left to disappear. As a result, the oil conduit 148 is allowed to communicate with the oil conduit 144, applying the same oil pressure as that applied to the torque converter inlet port 146 to the lock-up clutch oil chamber 14, causing the pressures on the both sides of the lock-up clutch 10 to become equal to each other, resulting in the release of the lock-up clutch 10. An orifice 174 is provided in the inlet of the port 150c and another orifice 178 is provided in the drain oil conduit connected with the port 150a. The orifice 178 is provided to prevent rapid drainage of the oil pressure from the lock-up clutch oil chamber 14 so as to alleviate shock upon shifting into the lock-up state, whereas, the orifice 174 is provided in the oil conduit 144 to permit a gradual increase in oil pressure within the lock-up oil chamber 14 so as to alleviate shock upon release from the lock-up state.

The torque converter outlet port 180 communicates with the oil conduit 182 which is provided with a relief valve 188 including a ball 184 and a spring 186 and thus, with this relief valve, the pressure within the torque converter 12 is maintained within a normal operating pressure range. The oil downstream of the relief valve 188 is introduced by an oil conduit 190 to an oil cooler and a lubricant circuit, both being unillustrated, and is finally drained, whereas, excessive oil is drained by another relief valve 192, the thus drained oil being returned finally to a tank 114.

Next, an explanation is made regarding the control unit 300 which controls the shift motor 110 and the lock-up solenoid 200. The shift motor 110 is a stepper motor and thus referred hereinafter to as the stepper motor.

Figure 4:
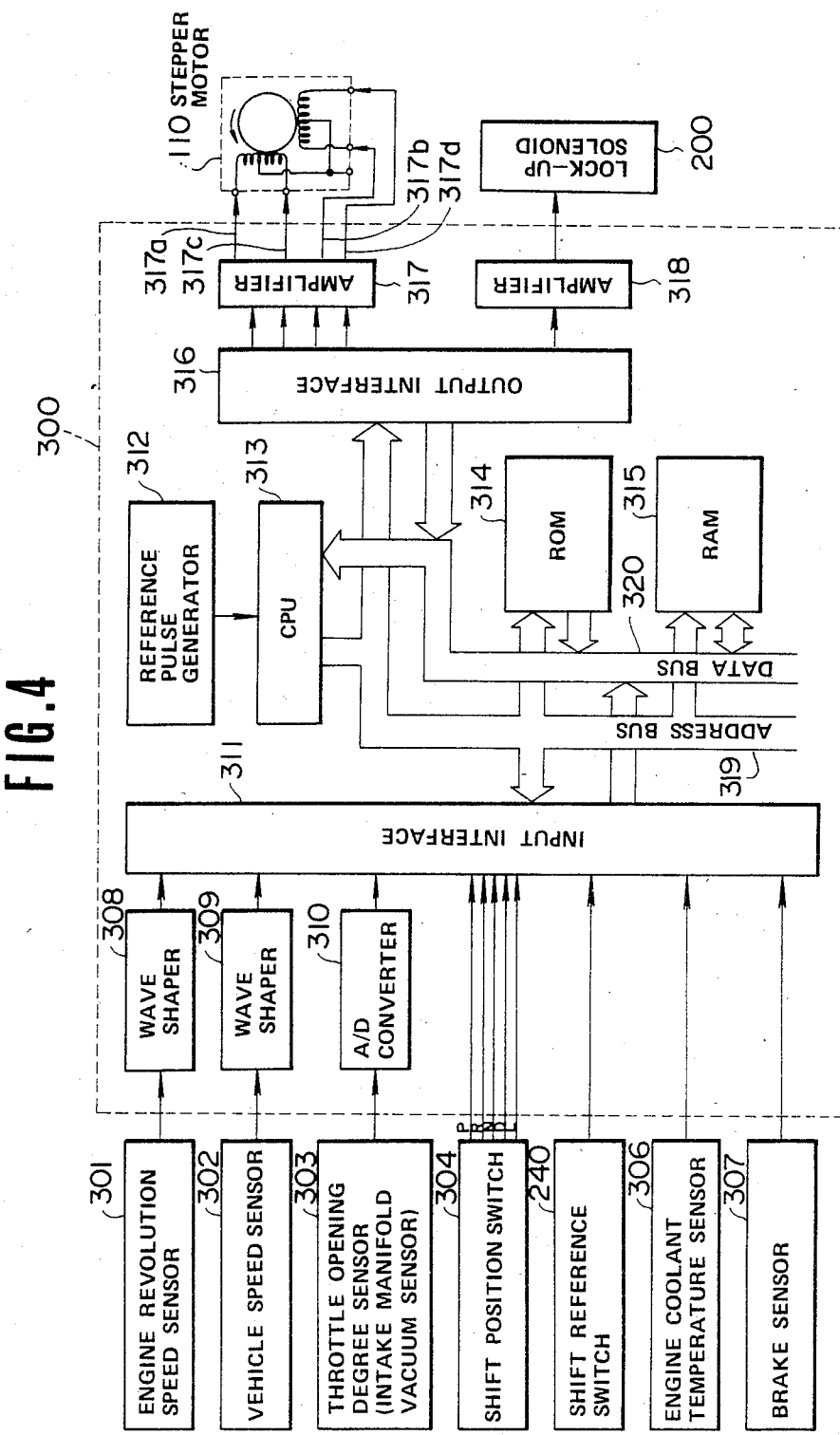
FIG. 4 is a block diagram showing a control unit for controlling a stepper motor 110 and a lock-up solenoid 200 shown in FIG. 3.

As shown in FIG. 4, the control unit 300 receives input signals from an engine revolution speed sensor 301, a vehicle speed sensor 302, a throttle opening degree sensor 303, a shift position switch 304, a shift reference switch 240, an engine coolant temperature sensor 306, and a brake sensor 307. The engine revolution speed sensor 301 detects engine revolution speed by measuring the number of ignition spark pulses of the engine per unit time, and the vehicle speed sensor 302 detects vehicle speed by measuring the revolutions of the output shaft of the continuously variable transmission. The throttle opening degree sensor 303 detects the engine load by measuring the engine throttle opening degree, and generates an electric voltage signal. The throttle opening degree sensor 303 may be replaced with an intake manifold vacuum sensor or a fuel flow rate sensor. The shift position switch 304 detects which one of the range positions, namely, P range, N range, D range, and L range, is selected by the manual valve 104. The shift reference switch 240 is turned on when the sleeve 162 of the shift operating mechanism 112 assumes a position corresponding to the largest reduction ratio. For this purpose, the shift reference switch 240 is disposed such that it is turned on when the sleeve 162 is moved to the rightward limit position viewing in FIG. 3. The engine coolant temperature sensor 306 generates an electric voltage signal representative of the engine coolant temperature. The brake sensor 307 detects whether or not the vehicle brake is actuated. The sensor output signals generated by the engine revolution speed sensor 301 and vehicle speed sensor 302 are sent to an input interface 311 after passage through wave shapers 308 and 309, respectively. The electric voltage from the throttle opening degree sensor 303 is converted by an analog-digital (A/D) converter 310 into a digital signal before being sent to the input interface 311. In addition to the input interface 311 the shift control unit 300 comprises a reference pulse generator 312, a CPU (Central Processor Unit) 313, a ROM (Read Only Memory) 314, a RAM (Randam Access Memory) 315, and an output interface 316, which are linked with each other by an address bus 319 and a data bus 320. The reference pulse generator 312 generates reference pulses with which the CPU 313 is actuated. The ROM 314 stores programs necessary for controlling the stepper motor 110 and lock-up solenoid 200 and data necessary for controlling them. The RAM stores various parameters necessary for processing information from each of the sensors and switches and parameters necessary for controlling the stepper motor 110 and lock-up solenoid 200. Output signals from the control unit 300 are sent to the stepper motor 110 and lock-up solenoid 200 via respective amplifiers 317 and 318.

Hereinafter, a concrete explanation is made regarding a control method carried out by this control unit 300 in controlling the stepper motor 110 and lock-up solenoid 200.

The control may be divided into two routines, one being a lock-up solenoid control routine 500, the other being a stepper motor control routine 700.

Figure 5:
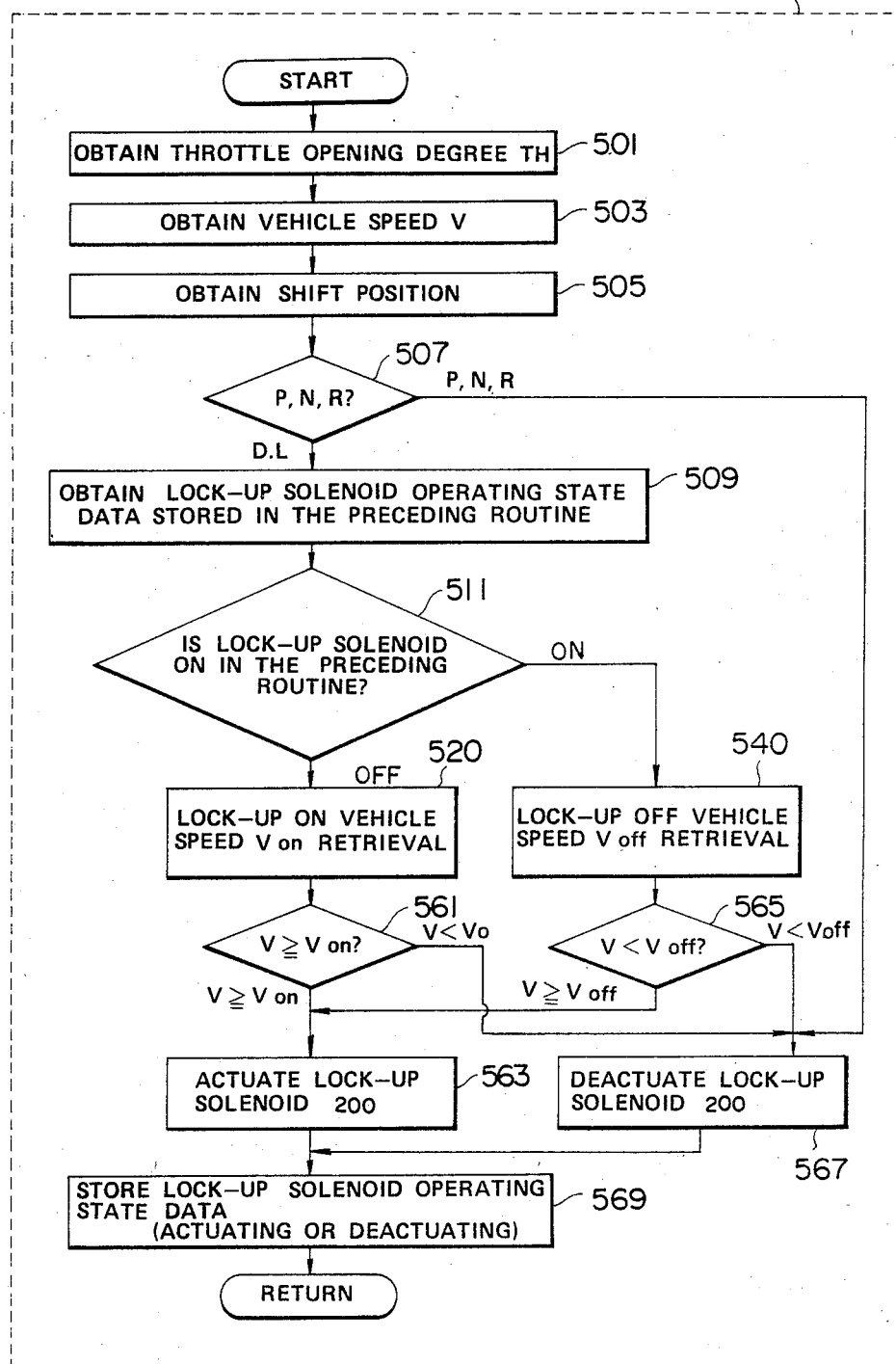
FIG. 5 is a flow chart of a lock-up solenoid control routine.
Figure 6:
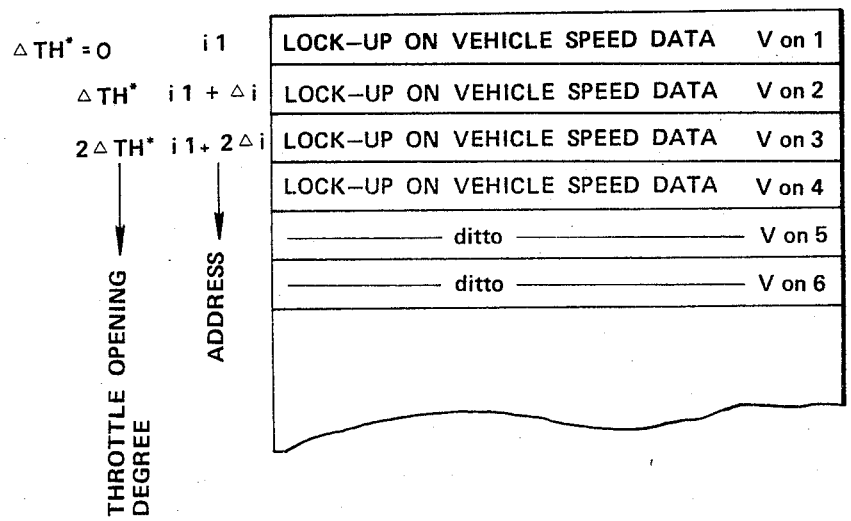
FIG. 6 is a diagrammatic view illustrating how lock-up on vehicle speed data are stored in a ROM 314 shown in FIG. 4.
Figure 7:
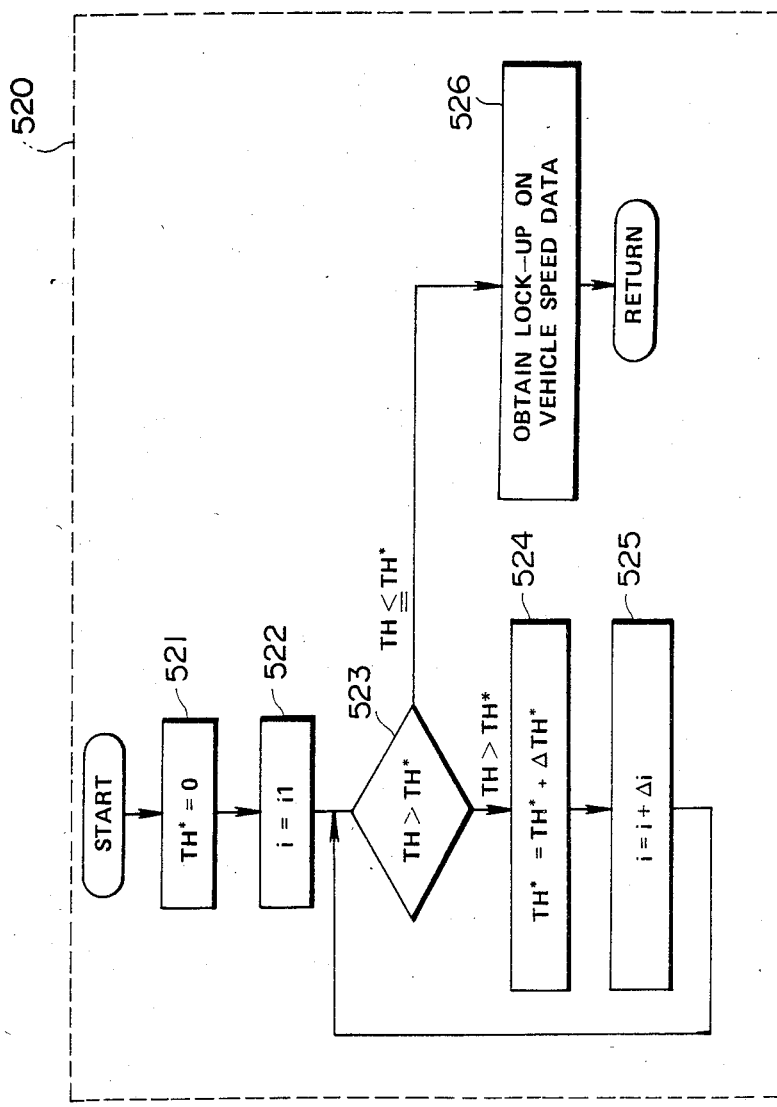
FIG. 7 is a flow chart showing a data retrieval routine for lock-up on vehicle speed data.

First of all, the control of the lock-up solenoid 200 is explained. The lock-up solenoid control routine 500 is shown in FIG. 5. The lock-up solenoid control routine 500 is executed once per a predetermined period of time. Thus, the execution of the following routine is repeated after a short period of time. A throttle opening degree signal TH indicative of the engine load is obtained from the throttle opening degree sensor 303 in step 501, then a vehicle speed indicative signal V is obtained from the vehicle speed sensor 302 in step 503 and after that a shift position indicative signal is obtained from the shift position switch 304 in step 505. A determination is made in step 507 whether any one of the P range, N range and R range is selected, and if the determination result reveals that the P range or N range or R range is selected, the lock-up solenoid 200 is deactuated (off state) in step 567 and then, in step 569, the present state of the lock-up solenoid 200 is stored in terms of lock-up solenoid operating state data in the RAM 315 before the program returns to START of the routine 500. It will now be understood that as long as the P range or N range or R range is selected, the lock-up solenoid 200 is not energized and thus the torque converter 12 is in the non lock-up state. If the determination made in the step 507 shows that the D range or L range is selected, the lock-up solenoid operating state data stored in the preceding routine is obtained from the RAM 315 in step 509, and then a determination is made in step 511 whether or not the lock-up solenoid 200 was actuated (or in the on state) in the preceding routine. If in the preceding routine the lock-up solenoid 200 was not actuated (or in the off state), the data are retrieved in step 520 relating to a vehicle speed value (a lock-up on vehicle speed value Von) above which the lock-up solenoid 200 is to be actuated. The data retrieval routine 520 is described in connection with FIGS. 6, 7 and 8. Lock-up on vehicle speed data Von, such as, Von1-~Von6, are stored in the ROM 314 for various throttle opening degrees as shown in FIG. 6. Referring to FIG. 7, illustrating the data retrieval routine 520, a reference throttle opening degree TH* is set at zero in step 521 to represent an idle position and then an address i for the ROM 314 is given a number i1 that corresponds to the number zero of the reference throttle opening degree TH* (in step 522). Then, the actual throttle opening degree TH is compared with the reference throttle opening degree TH* (in step 523). If the actual throttle opening degree TH is smaller than or equal to the reference throttle opening degree TH*, the number i1 indicates an address in the ROM 314 where optimum lock-up on vehicle speed data Von corresponding to the actual throttle opening degree TH is stored and the lock-up on vehicle speed data Von is obtained from the address given by the number i1 (in step 526). On the other hand, if the actual throttle opening degree TH is greater than the reference throttle opening degree TH* as a result of the determination conducted in the step 523, the reference throttle opening degree TH* is increased by a predetermined value $\Delta TH^*$ (in step 524) and address i is increased by a predetermined value $\Delta i$ (in step 525). Thereafter, the program returns to the step 523 again where the actual throttle opening degree TH is compared with the reference throttle opening degree TH*. By repeating a chain of these steps (steps 523, 524 and 525), the number of the address i in the ROM 314 is given where a lock-up on vehicle speed data Von corresponding to the actual throttle opening degree TH is stored. Then, the lock-up on vehicle speed data Von is obtained from the address i.

Referring again to FIG. 5, after the completion of the data retrieval routine 520 the lock-up on vehicle speed data Von is compared with the actual vehicle speed V (in step 561) and if the actual vehicle speed V is higher than or equal to the lock-up on vehicle speed Von, then the lock-up solenoid 200 is actuated (in step 563), whereas if the relationship is reversed, the lock-up solenoid 200 is not actuated (in step 567), and then operating state data that indicates an actuating state or a deactuating state is stored in the RAM 315 (in step 569).

If, in the step 511, the lock-up solenoid 200 was found to be actuated in the preceding routine, a retrieval routine for vehicle speed data Voff (a lock-up off vehicle speed) below which the lock-up is to be released is executed (in step 540). This data retrieval routine 540 is substantially the same in operation as the data retrieval routine 520 for lock-up on vehicle speed data Von (the only difference being in the stored data as follows) and therefore the explanation thereof is omitted.

Figure 8:
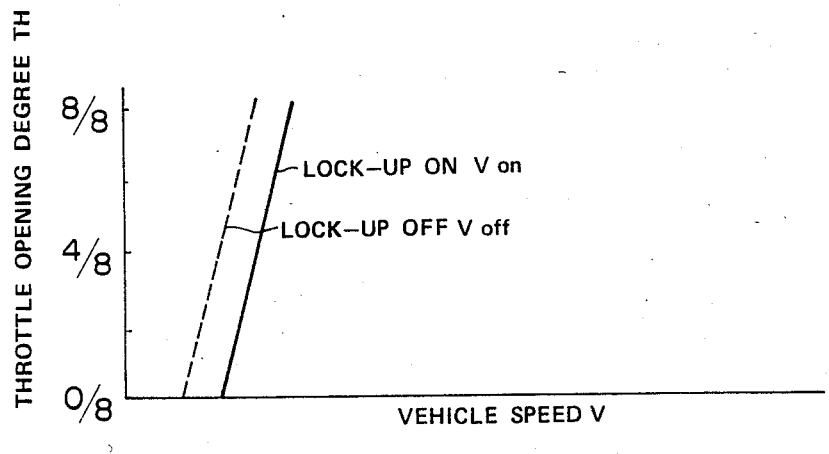
FIG. 8 is a graph showing a relationship between a lock-up on vehicle speed Von and a lock-off vehicle speed Voff.

The lock-up on vehicle speed data Von and the lock-up off vehicle speed data Voff have the relationship as shown in FIG. 8. The relationship that Von is greater than Voff provides hysteresis. This prevents the occurrence of hunting of the lock-up solenoid 200.

After the completion of the step 540, the lock-up off vehicle speed data Voff which has been retrieved in the step 540 is compared with the actual vehicle speed V in step 565, and if the vehicle speed V is higher than or equal to the lock-up off vehicle speed Voff, the lock-up solenoid 200 is actuated in step 563. If V is lower than Voff, the lock-up solenoid 200 is deactuated in step 567. Then the lock-up solenoid operating state indicative data is stored in the RAM 315 before the program returns to START.

Hereinafter, the stepper motor control routine 700 for the stepper motor 110 will be explained in connection with FIGS. 9(a), 9(b) and 9(c). The stepper motor control routine 700 is executed once per a predetermined time period. Thus, the execution of the following routine is repeated after a short period of time. First, the solenoid operating state data which was stored in the step 569 (see FIG. 5) of the lock-up solenoid control routine 500 is obtained in step 698 (see FIG. 9(a)), and a determination is made of the lock-up state in step 699. If the lock-up solenoid 200 was actuated, the execution of a routine beginning with a step 701 starts, whereas if the lock-up solenoid 200 was not actuated, the execution of a chain of steps beginning with step 713 (see FIG. 9(b)) starts. In the latter case, the control is made, in a manner described later, such that the largest reduction ratio is maintained. That is, the largest reduction ratio is maintained during operation with the torque converter 12 in the non lock-up state.

If, in step 699, the lock-up solenoid 200 is actuated, the throttle opening degree TH is obtained from the throttle opening degree sensor 303 in step 701, then the vehicle speed V is obtained from the vehicle speed sensor 302 in step 703, and after that then the shift position is obtained from the shift position switch 304 (in step 705). Subsequently, a determination is made whether or not the present shift position is in the D range in step 707. If the present shift position is in the D range, a D range shift pattern data retrieval routine is executed in step 720 after executing steps 897 to 912.

Referring to FIG. 9(c), steps 897 to 912 are described wherein the reduction ratio is increased upon rapid increase in the depression degree of the accelerator pedal. The depression degree of the accelerator pedal is expressed in terms of the throttle opening degree indicative signal TH. First of all, a determination is made in step 897 whether the actual vehicle speed V is greater than or equal to a predetermined vehicle speed value F (for example, 10 km/h). If the actual vehicle speed V is less than the predetermined value F, a timer Ta (which is described later) is cleared to zero in step 898, a timer Tb (which is later described) is cleared to zero in step 899, and the preceding routine throttle opening degree THo is given a maximum value THmax in step 900. Then, the program goes to step 720 (see FIG. 9(a)) wherein D range shift pattern retrieval is executed. Since, in the above process, flow along step 897, step 898, step 899 and step 900, the throttle opening degree TH obtained in step 701 (see FIG. 9(a)) and the vehicle speed V obtained in step 703 (see FIG. 9(a)) are not corrected, the execution of the step 720 results in providing the normal shift pattern as will be later described.

If, in step 897, the actual vehicle speed V is greater than or equal to the predetermined value F, a determination is made in step 901 whether a timer value Ta is greater than or equal to a predetermined period of time ta (for example, 1 sec.). The throttle opening degree TH is obtained each time after the elapse of this predetermined period of time ta. Since the timer value Ta was set to zero during the initialization, Ta is less than ta in this routine, thus the program goes to step 902 wherein the timer value Ta is increased by a predetermined small value ΔTa and then a determination is made in step 903 whether the timer Tb is not equal to zero (i.e., the timer Tb is actuated) or equal to zero (i.e., Tb is not actuated). Since the timer Tb is zero because it was set to zero at the intialization, the program goes to step 720. The execution of the flow along step 901, step 902, step 903 and step 720 is repeated until the timer value Ta agrees with the reference period of time ta. Thus, D range pattern retrieval in step 720 is executed in the normal manner for the reference period of time ta because the throttle opening degree TH and the vehicle speed V are not corrected. If the timer value Ta reaches the reference period of time ta, the program goes from step 901 to step 904 wherein the timer value Ta is cleared to zero. This means that in the next routine the program will go from step 901 to step 902. As will now be understood, the execution of step 904, step 905, step 906 and its subsequent steps is repeated after the elapse of the reference period of time ta. Referring to steps 905 and 906, a difference ΔTH between the preceding routine throttle opening degree THo (which was stored in the RAM 315) and the throttle opening degree TH which has been obtained in step 701 (see FIG. 9(a)) during the present routine is determined in step 905, and in the next step 906, the preceding routine throttle opening degree THo is given the present routine throttle opening degree TH for execution during the next routine. Then, a determination is made whether or not a value ΔTH+G, where G is a small value, is positive or negative in step 907. If ΔTH+G is less than zero, the timer Tb is cleared to zero in step 897 and then the program goes to step 720. The fact that ΔTH+G is less than zero indicates that the throttle opening degree is decreasing, i.e., the depression degree of the accelerator pedal is decreasing, because ΔTH which indicates a change in throttle opening degree during the reference period of time ta is negative. Under this condition, the normal shift pattern is provided by the D range pattern retrieval in step 720. If ΔTH+G is greater than or equal to zero, the change in throttle opening degree during the reference period of time ta is greater than or equal to zero, i.e., the throttle opening degree is increasing or maintained constant. The value G which is added to the ΔTH is to keep the value ΔTH+G positive or negative even if the throttle opening degree happens to be closed by a small degree due to vibration or the like. Then the program goes to step 908 where a determination is made whether the timer Tb is equal to zero (i.e., Tb is not actuated) or not equal to zero (i.e., Tb is actuated). Since the timer Tb is zero as a result of initialization, the program goes from step 908 to step 909 wherein a determination is made whether ΔTH is greater than or equal to a predetermined throttle opening degree value A. The determination is made in this step whether the change in the throttle opening degree is rapid or gradual. If ΔTH is less than the predetermined value A (i.e., the change in the throttle opening degree is gradual), the program goes to step 720 and thus the normal shift pattern is provided by the D pattern retrieval in step 720. If ΔTH is greater than or equal to the predetermined value A (i.e., the change in the throttle opening degree is rapid), a determination is made in step 910 whether the timer Tb is less than a reference period of timer tb (for example, 2 to 3 seconds). If the timer Tb is less than the reference period of time tb, the timer Tb is increased by a small value ΔTb in step 911, and the throttle opening degree TH is increased by a value k·ΔTH (k: constant) in step 912. Subsequently, the D range pattern retrieval is executed in step 720 based on the throttle opening degree which has been increased by k·ΔTH in step 912. As will be later described, since, according to the shift pattern, the more the throttle opening degree increases, the more the reduction ratio increases for the same vehicle speed, a reduction ratio larger than the normal reduction ratio is obtained upon rapid increase in the throttle opening degree. Since, in the subsequent routines, the timer Tb is not equal to zero, the program always goes from step 908 to step 910. The throttle opening degree TH obtained in step 701 (see FIG. 9(a)) is increased by k·ΔTH in each routine until Tb becomes greater than or equal to the reference period of time tb. Upon the timer Tb reaching the reference period of time tb as a result of repeating the increment of the timer Tb (step 911) and the correction (increment) of the throttle opening degree TH (step 912), the program goes from step 910 to step 913 wherein the timer Tb is reset to zero. Therefore, the determination whether ΔTH is greater than or equal to the value A (step 909) is repeated after the elapse of the period of time tb.

If, in the preceding step 903, the timer Tb is not equal to zero (i.e., the timer Tb is actuated), a determination is made whether the before mentioned value ΔTH+G is greater than or equal to zero in step 914, and if ΔTH+G is greater than or equal to zero, the program goes to step 910. If, on the other hand, ΔTH+G is less than zero in step 914, the timer Tb is set to zero in step 897', and the program goes to step 720. That is, the correction of the throttle opening degree TH terminates when the throttle opening degree decrease even during the reference period of time tb after initiation of the correction of the throttle opening degree TH.

Figure 22:
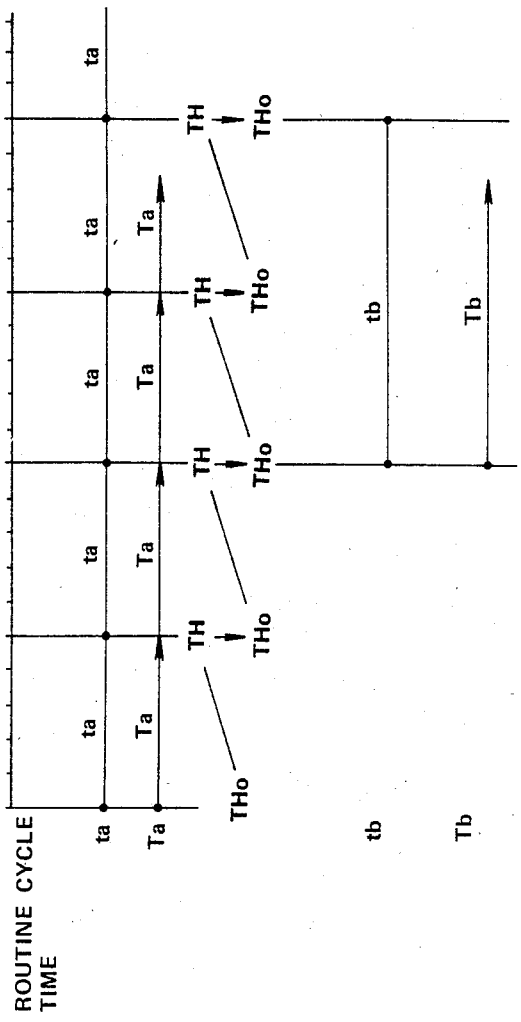
FIG. 22 is a timing diagram showing the relation between a reference period of time ta and another reference period of time th.

Referring to FIG. 22, the relation between the reference period of time ta and the reference period of time tb during the execution of the steps 897 to 912 is described.

The timer value Ta is reset to zero each time upon the elapse of the reference period of time ta (i.e., the flow from step 901 to step 902 switches to the flow from step 901 to step 904) and then the change in throttle opening degree during the reference period of time ta is determined. The reference period of time tb is n times longer than the reference period of time ta, where: n is a natural number. The correction of the throttle opening degree is released when the throttle opening degree decreases (the flow along steps 903→914→897).

Figure 10:
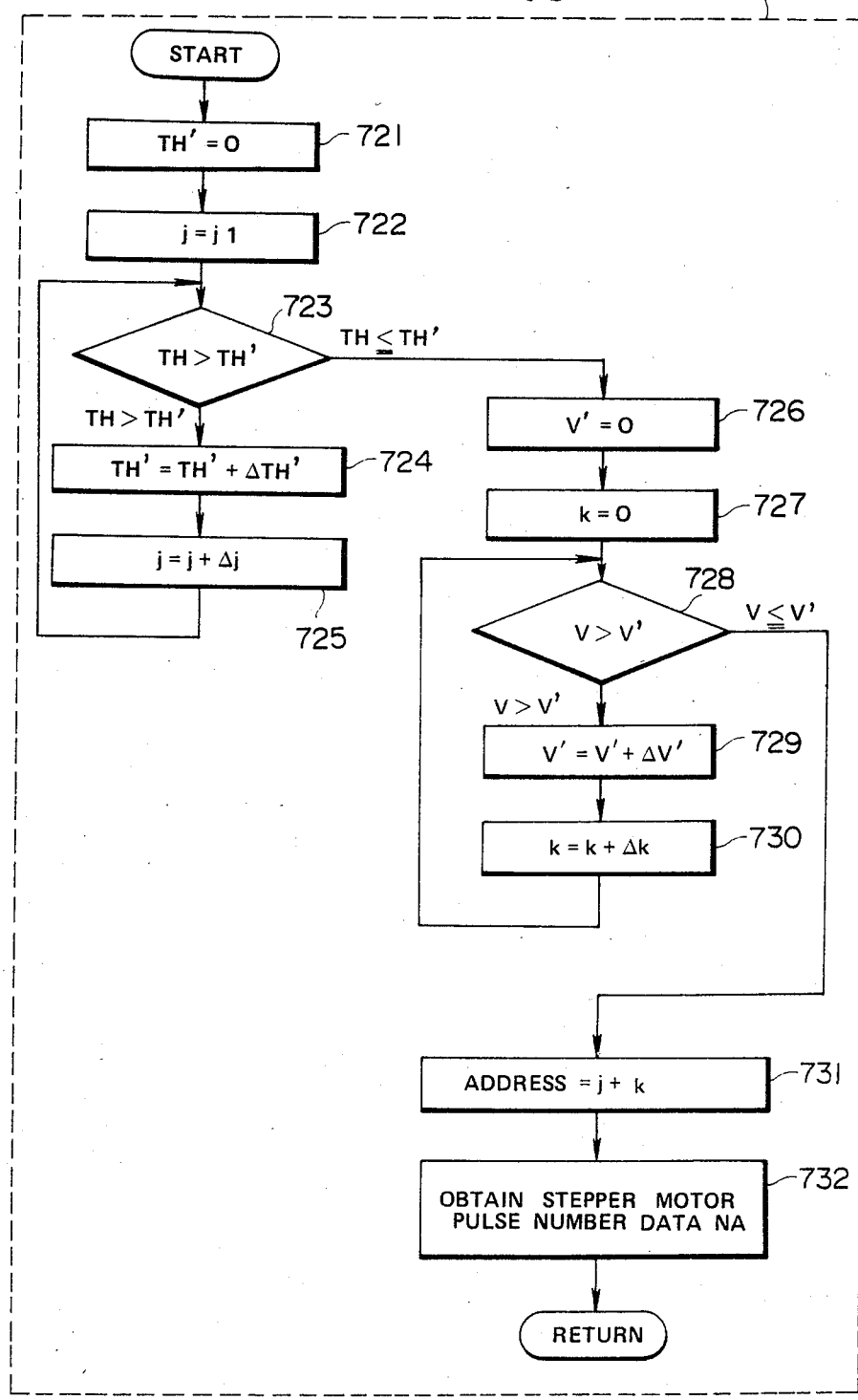
FIG. 10 is a flow chart showing a D range pattern data retrieval routine.

The D range shift pattern data retrieval routine in step 720 provides a desired optimum reduction ratio indicative signal. The desired reduction ratio indicative signal represents a desired optimum reduction ratio for the detected operating condition of the automotive vehicle and is expressed in terms of a number of pulses ND which is hereinafter called a stepper motor pulse number. The D range shift pattern data retrieval routine is executed in a manner illustrated in FIG. 10. The stepper motor pulse number data ND are stored in the ROM 314 in a matrix shown in FIG. 11. The vehicle speed values are arranged along the lateral axis and the throttle opening degree values are arranged along the vertical axis (the vehicle speed increases toward the right in FIG. 11 and the throttle opening degree increases toward the bottom in FIG. 11). Referring to the D range shift pattern data retrieval routine 720 shown in FIG. 10, a reference throttle opening degree TH' is zero which corresponds to idle position in step 721 and an address j of the ROM 314 where a stepper motor pulse number data which corresponds to zero throttle opening degree is given a number j' in step 722. Subsequently, the actual throttle opening degree TH is compared with the reference throttle opening degree TH' in step 723. If the actual throttle opening degree TH is greater than TH', the reference throttle opening degree TH' is increased by ΔTH' in step 724 and the address j is increased by a predetermined amount Δj in step 725. After this step, the actual throttle opening degree TH is compared with the reference throttle opening degree TH' again (in step 723), and if the actual throttle opening degree TH stays greater than TH', the steps 724, 725 and 723 are repeated. After the execution of the steps 723, 724 and 725 has been repeated, the number j corresponding to the actual throttle opening degree TH is given when the actual throttle opening degree TH becomes equal or smaller than the reference throttle opening degree TH'. Subsequently, steps 726, 727, 728, 729 and 730 are executed in relation to vehicle speed V. As a result, the number k is given which corresponds to the actual vehicle speed V. Then, the number k thus given is combined with the number j in step 731, thus producing an address corresponding to a set of the actual throttle opening degree TH and the actual vehicle speed V, and the stepper motor pulse number data ND is obtained from this address in step 732. The pulse number data ND thus obtained shows a desired stepper motor pulse number to be given for the actual throttle opening degree TH and the actual vehicle speed V. The D range shift pattern data retrieval routine 720 ends with the step of retrieving the pulse number data ND before the program returns to START.

Referring to FIG. 9(a), if the D range is not selected as the result of the determination in the step 707, then a determination is made whether the L range is selected in step 709, and if the L range is selected, a L range shift pattern data retrieval routine is executed (in step 740). The L range shift pattern data retrieval routine is substantially similar to the D range shift pattern data retrieval routine 720 except that the stepper motor pulse number data NL are different from the stepper motor pulse number data ND (the difference between the pulse number data ND and NL will be described hereinafter) and are stored at different addresses in the ROM 314. A detailed explanation thereof is, therefore, omitted.

If neither the D range nor the L range is selected, a determination is made whether the R range is selected in step 711. If the R range is selected, a R range shift pattern data retrieval routine 760 is executed in step 760. The R range shift pattern data retrieval routine 760 is substantially similar to the D range shift pattern data retrieval routine 720 except that different stepper motor pulse number data NR are stored and thus a detailed explanation thereof is omitted.

After the data retrieval of the suitable pulse number data ND, NL or NR in the respective step 720, 740 or 760, a shift reference switch data is obtained from the shift reference switch 240 in step 778 and then a determination is made whether the shift reference switch 240 is in the on-state or the off-state in step 779. The shift reference switch data indicates whether the shift reference switch 240 is turned on or off. If the shift reference switch 240 is in the off state, the actual stepper motor pulse number data NA is retrieved from the RAM 315 in step 781. This pulse number data NA corresponds one to one to the actual rotary position of the stepper motor 110 unless there is any electric noise. If, in the step 779, the shift reference switch 240 is in on state, the pulse number data NA is value zero value in step 780. The shift reference switch 240 is so designed as to be turned on when the sleeve 162 assumes a position corresponding to the largest reduction ratio. As a result the rotary position of the stepper motor 110 is turned to correspond to the largest reduction ratio position whenever the shift reference switch 240 is turned on. Because the actual pulse number data NA is set to zero value whenever the shift reference switch 240 is turned on, the pulse number data NA can correspond accurately to the actual rotary position of the stepper motor 110 should there occur a signal distortion due to electric noise. Consequently, the signal distortion due to the accumulation of noise is eliminated. Subsequently, in step 783 (see FIG. 9(b)), the actual pulse number data NA is compared with the retrieved desired pulse number data ND, NL or NR.

Referring to FIG. 9(b), if the actual pulse number data NA is equal to the desired pulse number data ND, NL or NR as the result of step 783, a determination is made whether the desired pulse number ND, NL or NR is zero in step 785. In the case the desired pulse number ND, NL or NR is not zero when the reduction ratio is not the largest, the same stepper motor actuating signals (described hereinafter) as provided for in the preceding routine are sent out in step 811 before the program returns to START. If the desired pulse number ND, NL or NR is zero in the step 785, the shift reference switch data is obtained from the shift reference switch 240 in step 713, and a determination is made whether the shift reference switch 240 is in the on state or the off state in step 715. If the shift reference switch 240 is in the on state, the actual pulse number data NA is given a zero value in step 717, a stepper motor timer value T which will be described later is set to zero in step 718, and then the same stepper motor actuating signals as those of the preceding routine which correspond to the zero pulse number are sent out in step 811. If, in step 715, the shift reference switch 240 is in the off state, the execution of the steps following the step 801, which will be described later, begins.

If, in the step 783, the actual pulse number NA is smaller than the desired pulse number ND, NL or NR, the stepper motor 110 needs to be actuated in a direction to cause the pulse number to increase. First, a determination is made whether the timer value T is negative or zero in step 787. If the timer value T is positive, then the time value T is decreased by a predetermined value ΔT in step 789, and then the same stepper motor actuating signals as those of the preceding routine are sent out in step 811 before the program returns to START. This step 789 is repeated until the timer value T becomes zero or negative. When the timer value T becomes zero or negative after elapse of a predetermined period of time, then the stepper motor actuating signals for the stepper motor 110 are moved in the upshift direction by one stage in step 791 as described later. Then, the timer value T is given a predetermined positive value T1 in step 793; the stepper motor pulse number NA is increased by 1 in step 795, and the stepper motor actuating signals which have been moved by one stage in the upshift direction are sent out in step 811 before the program returns to START. This causes the stepper motor 110 to rotate toward the upshift direction by one unit.

If, in step 783, the present stepper motor pulse number NA is larger than the desired pulse number ND, NL or NR, a determination is made whether the timer value T is zero or negative in step 801. If the timer value T is positive, the timer value T is decreased by the predetermined value ΔT (in step 803), and the same stepper motor actuating signals as those of the preceding routine are sent out in step 811 before the program returns to START. After repeating this series of operations, the timer value T becomes zero or negative after elapse of a predetermined period of time because the decrement of the timer T by the predetermined value ΔT is repeated. When the timer value T becomes zero or negative, the stepper motor actuating signals are moved toward a downshift direction by one stage in step 805. Then, the timer value T is given the predetermined positive value T1 in step 807, the stepper motor pulse number data NA is decreased by 1 in step 809, and the stepper motor actuating signals having been moved in the downshift direction are sent out (in step 811) before the program returns to START. This causes the stepper motor 110 to rotate in the downshift direction by one unit.

Figures 11, 12:
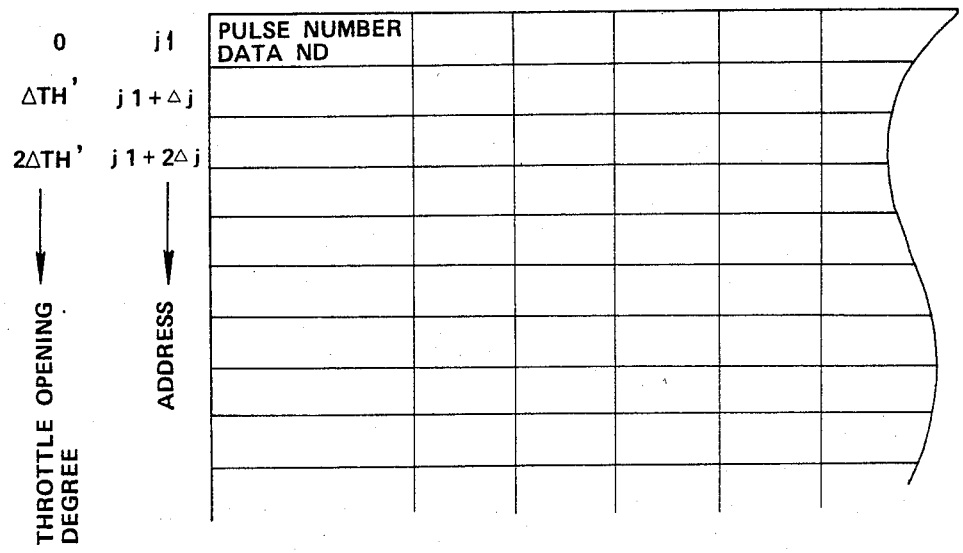
FIG. 11 is a diagrammatic view illustrating how pulse number data ND are stored in a matrix in the ROM 314 versus throttle opening degree and vehicle speed.
FIG. 12 is a chart illustrating various modes of stepper motor actuating signals applied to output leads 317a, 317c, 317b and 317d of the stepper motor 110.
Figure 13:
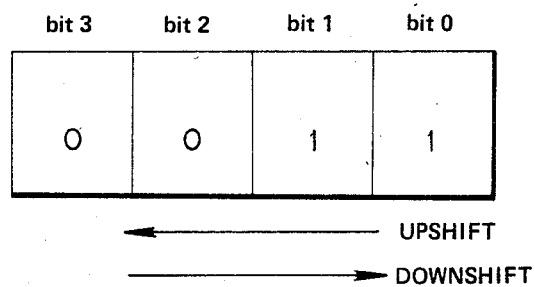
FIG. 13 is a diagrammatic view of the content of four bit positions corresponding to the mode A.
Figure 14:
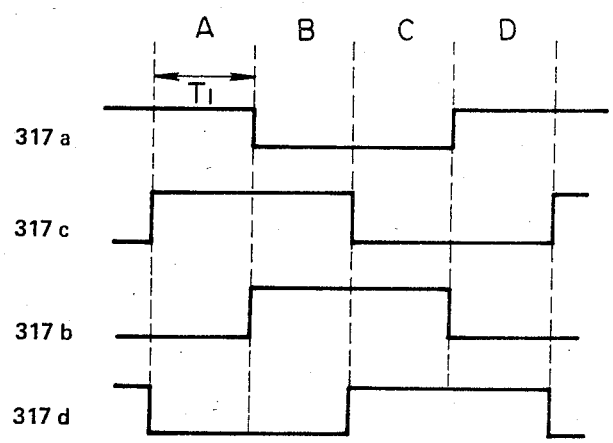
FIG. 14 is a timing diagram of the stepper motor actuating signals.

Referring to FIGS. 12 to 14 and particularly to FIGS. 13 and 14, the stepper motor actuating signals will now be described. The stepper motor 110 is connected with four output lead lines 317a, 317b, 317c, and 317d (see FIG. 4) having thereon respective signals which may vary in four modes A~D, and the stepper motor 110 rotates in the upshift direction (the direction denoted by an arrow X as shown in FIGS. 3 and 4) if the actuating signals are moved in the sequence of A→B→C→D→A, and the stepper motor 110 rotates in the reverse or downshift direction if the actuating signals are moved in the sequence of D→C→B→A→D. Referring to FIG. 13 which illustrates the content of the bits corresponding to the mode A of the actuating signals, the digit "1" is written in bit position 0, the digit "1" in bit position 1, the digit "0" in bit position 2, and the digit "0" in bit position 3. The bit positions 0, 1, 2, 3 correspond to the signals to be applied to the respective leads 317a, 317c, 317b and 317d. If the digit is "1" in a particular bit position, a signal voltage having a high level is applied to the lead operatively associated with the particular bit position. If the digit in a particular bit position is "0", a signal voltage having a low level is applied to the corresponding lead. Consequently, when the stepper motor 110 is to be rotated in the upshift direction, the bits are rotated to the right, i.e., the digits are moved one place to the left. When the stepper motor 110 is to be rotated one step in the downshift direction, the bits are rotated to the left, i.e., the digits are moved one place to the right.

The variation of the signals on the output lead lines 317a, 317c, 317b, and 317d upon upshifting is illustrated in FIG. 14. In FIG. 14, the period of time during which each of modes A, B, C and D stays constant, agrees with the timer value T1 which has been obtained in the step 793 or 807.

As described above, the stepper motor actuating signals are moved to the left or in the upshift direction in step 791 when the actual pulse number, i.e., the actual reduction ratio, is smaller than the desired pulse number, i.e., the desired optimum reduction ratio, thus serving as actuating signals for rotating the stepper motor 110 in the upshift direction. In the reverse case, when the actual reduction ratio is larger than the desired optimum reduction ratio, the stepper motor actuating signals are moved to the right or in the downshift direction in step 805, thus serving as actuating signals for rotating the stepper motor 110 in the downshift direction. When the actual reduction ratio agrees with the desired optimum reduction ratio, the actuating signals are not moved to the left nor right, and the same actuating signals as those of the preceding routine are sent out. In this case, the stepper motor 110 will not rotate, thus maintaining the reduction ratio constant.

Figure 9:
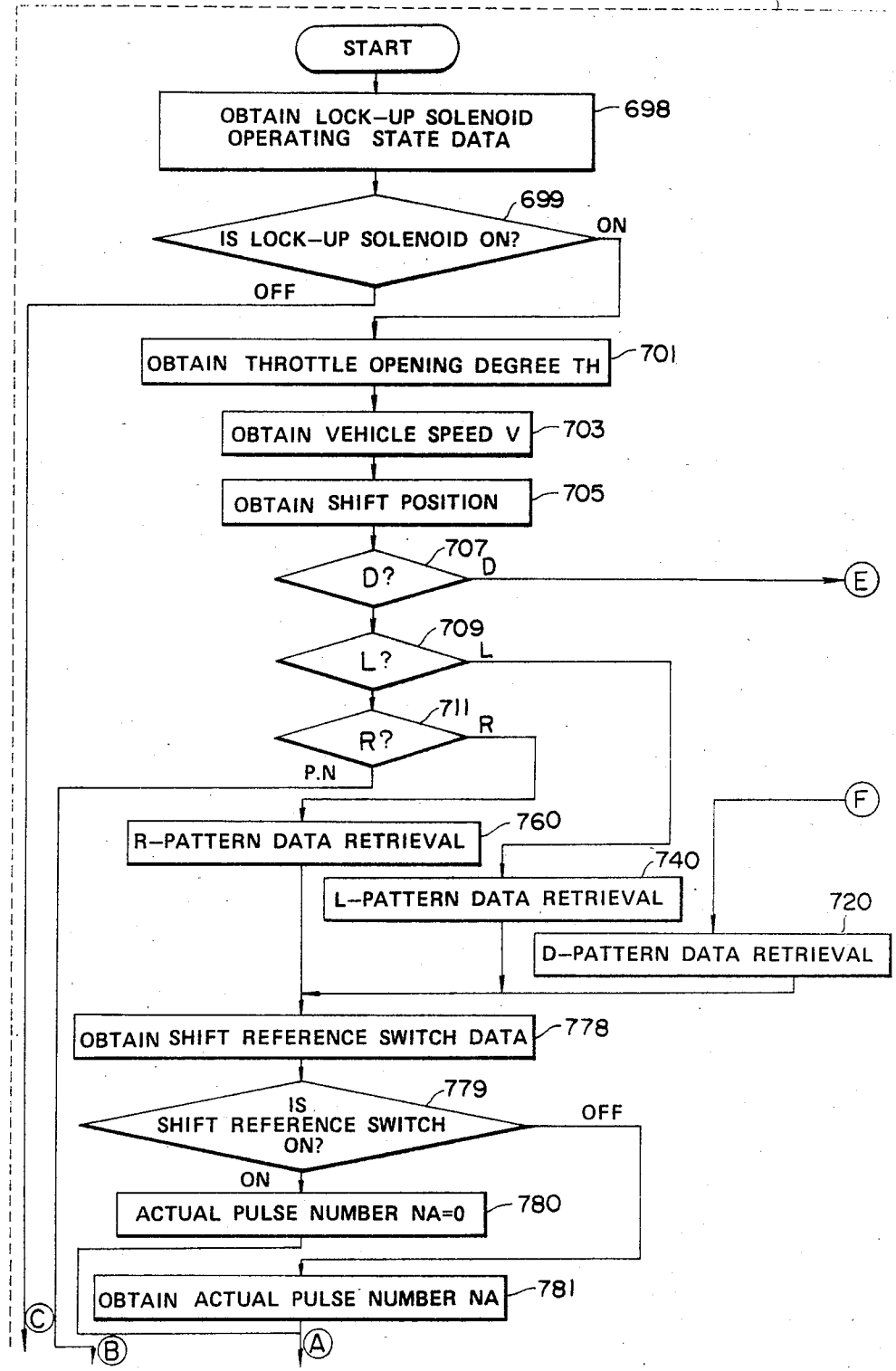
FIGS. 9(a), 9(b) and 9(c) illustrate a flow chart showing a stepper motor control routine.
Figure 9:
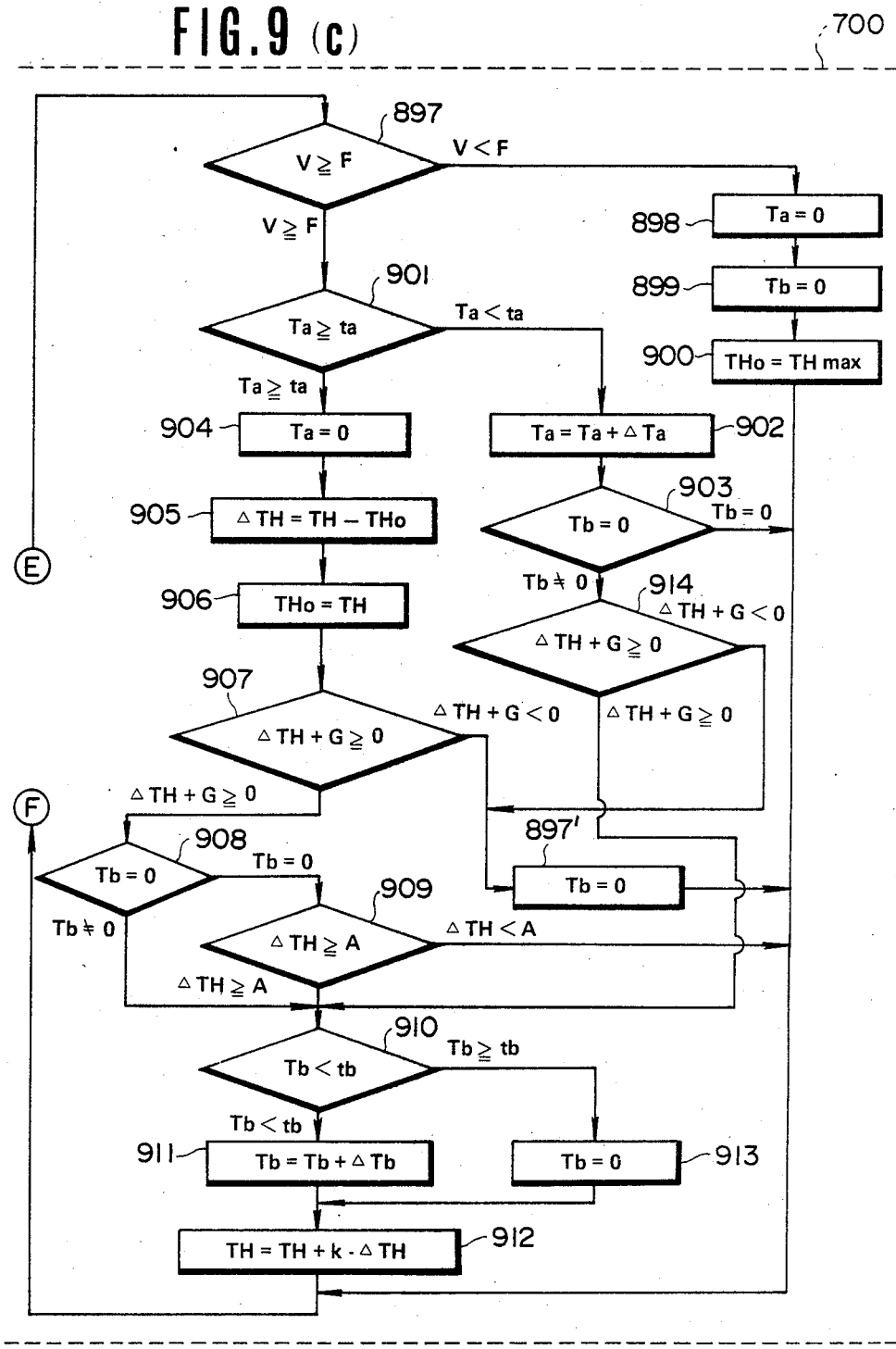

If, in the previously described step 711 shown in FIG. 9(*a*), the R range is not selected, i.e., if the P range or N range is selected, the execution of the step 713 and its following steps begins. The shift reference switch data is obtained from the shift reference switch 240 in step 713 and if the shift reference switch 240 is in the on state, the actual pulse number NA is given a zero value in step 717 and the stepper motor timer value T is given a zero value in step 718. Then, the same actuating signals as those of the preceding routine are sent out in step 811 before the program returns to START. If the shift reference switch 240 is in the off state, the steps following the step 801 are executed which have been described. That is, the stepper motor 110 is rotated in the downshift direction. Accordingly, the largest reduction ratio is maintained when the shift position is in the P or N range.

Hereinafter, a description is made as to how the desired optimum reduction ratio is determined.

Referring to FIGS. 15-19, a description will now be given of how the desired optimum reduction ratio is determined to satisfy the minimum fuel consumption rate curve during operation in the D range.

Figure 15:
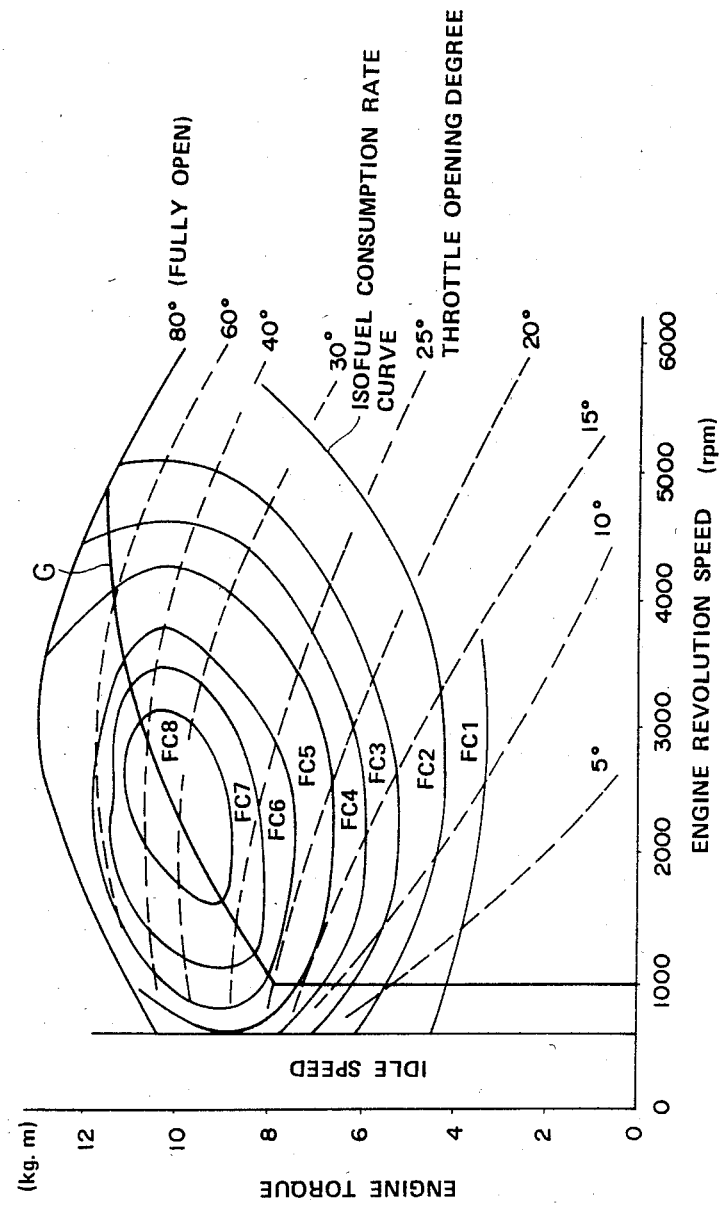
FIG. 15 is a graph showing a minimum fuel consumption rate curve G.
Figure 16:
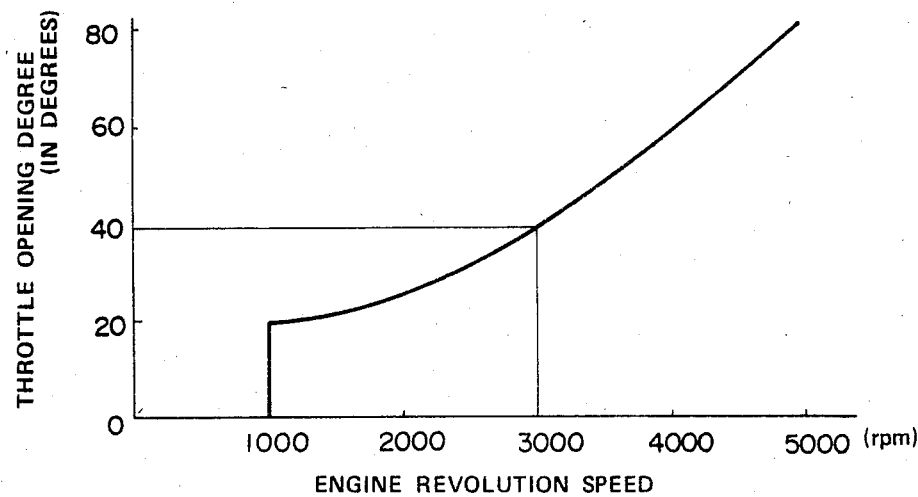
FIG. 16 is a graph showing the minimum fuel consumption rate curve expressed in terms of the throttle opening degree and engine revolution speed.
Figure 17:
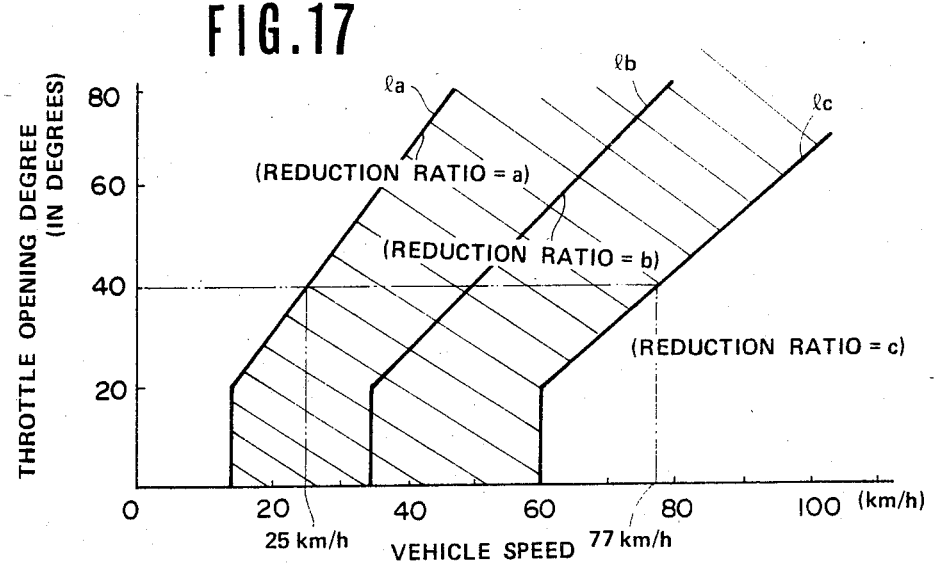
FIG. 17 is a graph showing the relationship shown in FIG. 16 expressed in terms of the throttle opening degree and vehicle speed for various reduction ratios.
Figure 18:
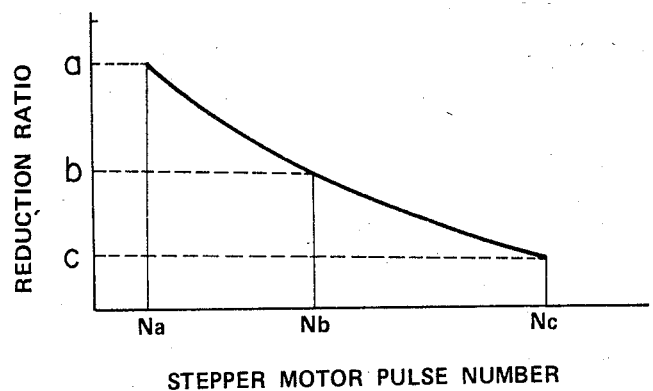
FIG. 18 is a graph showing a predetermined relationship of the reduction ratio with the stepper motor pulse number.
Figure 19:
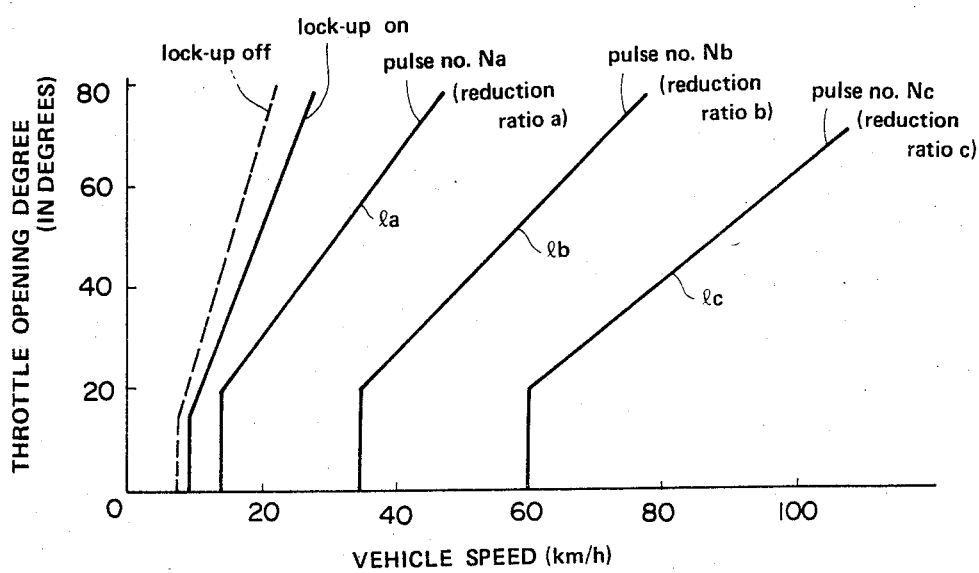
FIG. 19 is a graph showing a predetermined relationship shown in FIG. 16 expressed in terms of the throttle opening degree and vehicle speed for various pulse numbers.

Referring to FIG. 15, the engine performance curves are shown. In FIG. 15, engine revolution speed is expressed on the abscissa and engine torque on the ordinate and there are shown engine torque vs., engine revolution speed characteristic curves, each for a throttle opening degree (each curve being accompanied by a throttle opening degree) and there are also shown isofuel consumption rate curves FC1~FC8 (fuel consumption rate reducing in this numerical order). In FIG. 15, the minimum fuel consumption rate curve is denoted by the character G and the most efficient operational state is obtained if the engine is operated on this curve G. In order to control the continuously variable transmission so as to operate the engine along the minimum fuel consumption rate curve G, the pulse number data ND for the stepper motor 110 are determined in the following manner. If the minimum fuel consumption rate curve G is expressed in terms of throttle opening degree and engine revolution speed, the result may be expressed in FIG. 16. As will be understood, a single engine revolution speed is given for any throttle opening degree. For example, the engine revolution speed 3000 rpm is given for the throttle opening degree 40°. As shown in FIG. 16, the minimum engine revolution speed 1000 rpm is given for low throttle opening degrees (smaller than about 20 degrees) since the drive system of the continuously variable transmission would exhibit resonance with the engine vibration if the lock-up clutch is engaged with the engine revolution speeds below this minimum engine revolution speed. Assuming engine revolution speed is N and vehicle speed V, then the reduction ratio S is given by the equation:

$$S = (N/V) \cdot k$$

where, k denotes a constant determined by the final reduction ratio and the radius of the tire. It will now be understood from the above equation and FIG. 16 that the desired optimum reduction ratio is determined by the vehicle speed V and the target engine revolution speed N which satisfies a predetermined relationship with the throttle opening degrees, i.e., engine load, as shown in FIG. 16. If the relationship shown in FIG. 16 is expressed in terms of vehicle speed rather than the engine revolution speed, the result may be expressed as shown in FIG. 17. Even with the same engine revolution speed, the vehicle speed differs from reduction ratio to reduction ratio and this fact is expressed in terms of a range of vehicle speed as shown in FIG. 17. Line la denotes the variation upon selecting the largest reduction ratio (reduction ratio a), and line lc denotes the variation upon selecting the smallest reduction ratio (reduction ratio c), where lb denotes the variation upon selecting an intermediate reduction ratio b. For example, the vehicle can run at vehicle speeds from 25 km/h to 77 km/h with the throttle opening degree 40 while the reduction ratio decreases. The reduction ratio remains at a below 25 km/h and at c above 77 km/h with the throttle opening degree 40. A predetermined relationship exists between the position of the sleeve 162 of the shift operating mechanism 112 and a reduction ratio. This means that a predetermined relationship exists between the stepper motor pulse number applied to the stepper motor 110 (i.e., rotary position of the stepper motor 110) and the reduction ratio as shown in FIG. 18. Thus, the reduction ratios (a or b or c) shown in FIG. 17 can be converted into respective pulse numbers using the graph shown in FIG. 18. The result of this conversion is illustrated in FIG. 19. Also shown in FIG. 19 are the lock-up on and lock-up off vehicle speed lines shown in FIG. 8 from which it will be understood that the lock-up on and lock-up off vehicle speed lines are disposed on the lower vehicle speed side of the line a with the largest reduction ratio a.

Control of the continuously variable transmission with the shift pattern illustrated in FIG. 19 is as follows. Upon moving off from a standstill, the continuously variable transmission is maintained at the largest reduction ratio and the torque converter 12 is held in the non lock-up state. Therefore, a traction force strong enough for moving the vehicle off from the standstill is given. When the vehicle speed exceeds the lock-up on line, the lock-up clutch 10 of the torque converter 12 (see FIG. 1) engages, thus putting the torque converter 12 in the lock-up state. When the vehicle speed exceeds the line la as a result of an increase in the vehicle speed, the reduction ratio continuously varies between the reduction ratio and the reduction ratio c in such a manner as to satisfy the relationship denoted by the minimum fuel consumption rate curve G shown in FIG. 15. For example, if the throttle opening degree is increased from a state where the vehicle is running at a constant vehicle speed with a constant throttle opening degree in an operating range falling between lines 1a and 1c, the desired engine revolution speed changes and the desired pulse number changes with the change in the desired revolution speed as determined by the relationship illustrated in FIG. 16. The stepper motor 110 rotates to a new rotary position in response to the new desired stepper motor pulse number, establishing a new reduction ratio, thus allowing the actual engine revolution speed to agree with the new target engine revolution speed. The engine is controlled to operate along with the minimum fuel consumption rate curve G of the engine since, as described before, the stepper motor pulse number is determined to satisfy the minimum fuel consumption rate curve G of the engine. In this manner, the reduction ratio is controlled by controlling the stepper motor pulse number since each reduction ratio corresponds uniquely to a single stepper motor pulse number.

From the description above, it will be understood that the desired optimum reduction ratio is determined by the vehicle speed and the desired engine revolution speed which satisfies the predetermined relationship with the engine load.

Figure 20:
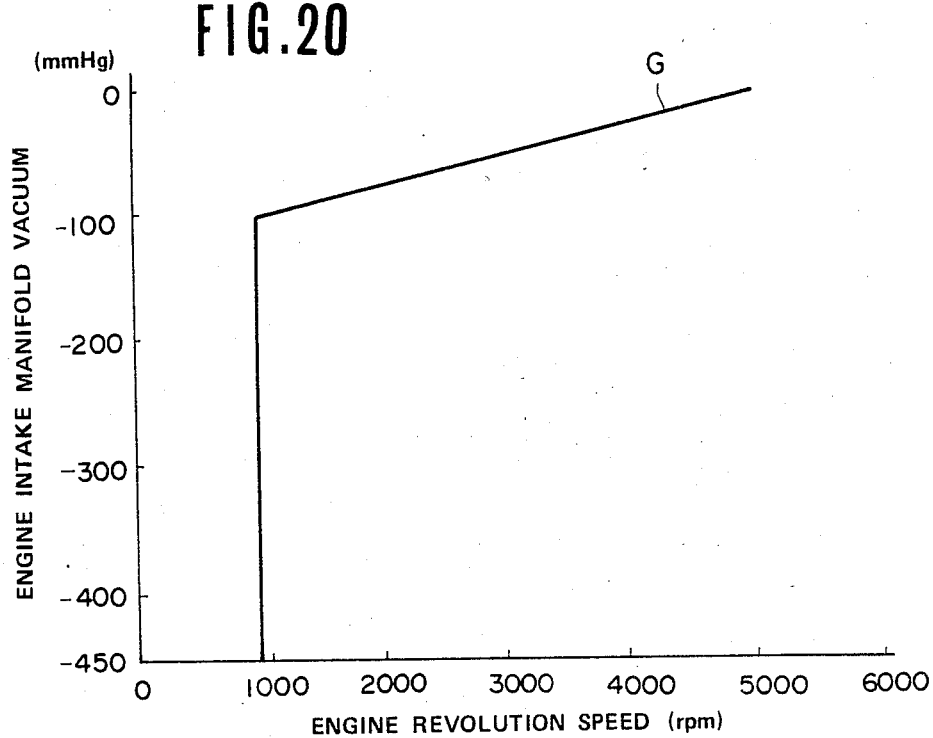
FIG. 20 is a graph showing the minimum fuel consumption rate curve expressed in terms of intake manifold vacuum and engine revolution speed.
Figure 21:
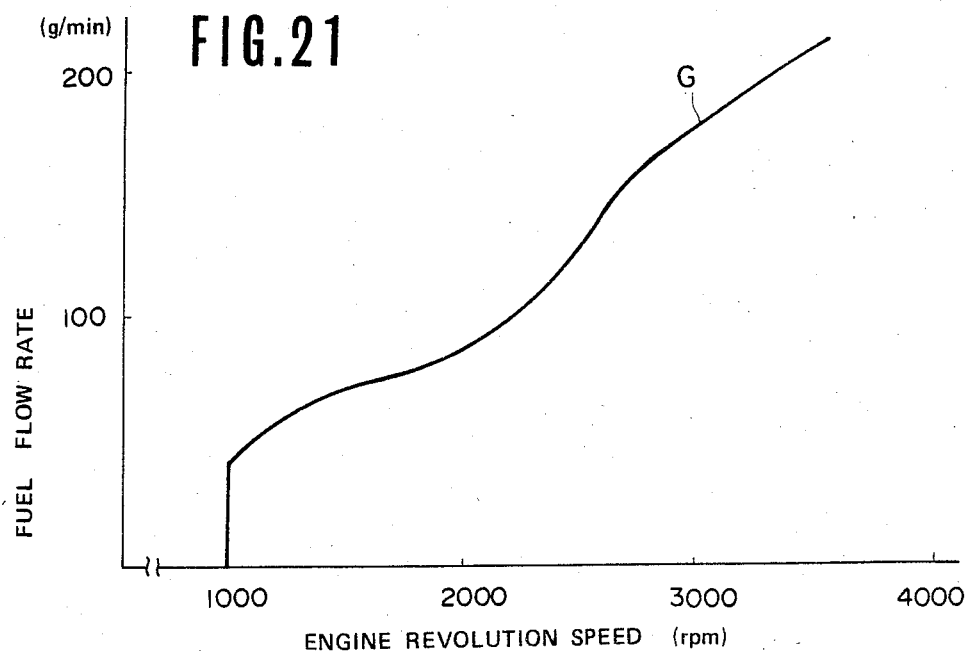
FIG. 21 is a graph showing the minimum fuel consumption rate curve expressed in terms of fuel flow rate.

In the embodiment described above, the control is based on the engine throttle opening degree, but it is also possible to carry out a similar control based on the intake manifold vacuum or the fuel flow rate. FIGS. 20 and 21 illustrate the minimum fuel consumption rate curves G for the latter two cases, respectively.

The focus of the above description has been placed on the shift pattern to be followed upon selecting the D range, but all that is necessary for operation in the L range or R range is to give data relating to different shift patterns from that in D range. For example, for the same throttle opening degree, a shift pattern for the L range is designed to give a larger reduction ratio as compared to the reduction ratio which is given by the shift pattern for the D range for the purpose of enhancing acceleration performance and ensuring adequate engine braking performance at zero throttle opening degree. In a shift pattern for the L range, a reduction ratio larger than the reduction ratio given by the shift pattern for the D range is given for the same throttle opening degree. These shift patterns can be accomplished simply by inputting appropriate predetermined pulse data. A more detailed explanation of the operation in the L and R ranges is omitted since the basic actions carried out to effect the control are the same as in the D range.

Next, a brief explanation will be given as to the engine coolant temperature sensor 306 and the brake sensor 307.

The engine coolant temperature sensor 306 is switched "on" when the engine coolant temperature is below a predetermined value (for example, 60° C.). When the engine coolant temperature sensor 306 is in the "on" state, the shift pattern for the D range is switched in response to this signal to a shift pattern having larger reduction ratios. This eliminates irregular running of the engine and engine power shortage which otherwise would take place upon start-up of a cold engine.

The brake sensor 307 is switched "on" when the foot brake is actuated. If the brake sensor 307 is in the "on" state and at the same time the throttle opening degree is zero, the shift pattern for the D range is switched to a shift pattern given larger reduction ratios. This ensures strong engine braking upon depressing the brake when operating in the D range.

Referring to FIG. 23 and FIGS. 9(a), 9(b) and 9(c) as well, a second embodiment is hereinafter described.

Figure 23:
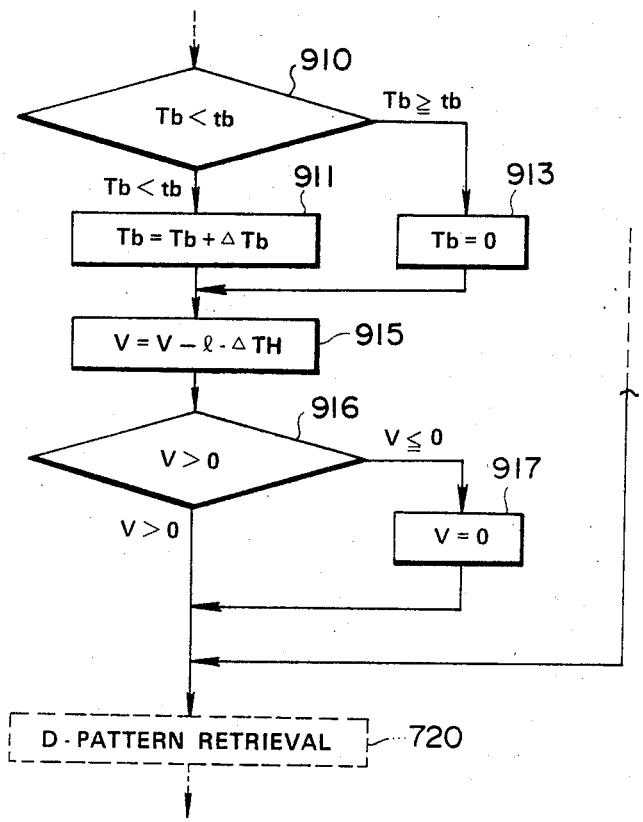
FIG. 23 is a portion of a flow chart of a stepper motor control routine of a second embodiment according to the present invention.

This embodiment results from replacing the step 910 to step 720 of the first embodiment shown in FIGS. 9(a), 9(b) and 9(c) with steps shown in FIG. 23 and provides substantially similar operation and effect to those of the first embodiment by correcting the vehicle speed indicative signal V instead of throttle opening degree indicative signal TH.

The description as to steps up to step 910 is omitted because these steps are substantially similar to the counterparts in the first embodiment. In step 910, a determination is made whether the timer Tb is less than the reference period of time tb. If Tb is less than tb, the timer Tb is increased by $\Delta$Tb in step 911 and then the vehicle speed V is decreased by l·$\Delta$TH in step 915 which has resulted from multiplying a coefficient l with $\Delta$TH obtained in step 905 (see FIG. 9(c)). Then, a determination is made whether the vehicle speed V corrected as above is greater than zero in step 916. If the vehicle speed V is less than or equal to zero, i.e., negative, the vehicle speed V is given zero in step 917 before the program goes to step 720 wherein the D range pattern retrieval is carried out based on zero vehicle speed. If the vehicle speed is greater than zero, the D range shift pattern is retrieved in step 720 based on the vehicle speed V corrected in step 915. If, in step 910, the timer Tb becomes greater than or equal to the reference period of time tb, the timer Tb is cleared to zero in step 913.

If the D range pattern retrieval is carried out based on the vehicle speed which has been decreased in step 915, a reduction ratio larger than the normal reduction ratio is obtained upon rapid increase in the throttle opening degree because according to the shift pattern, the more the vehicle speed decreases, the more the reduction ratio increase.

Although, in the above mentioned embodiment, the vehicle speed indicative signal V has been corrected in the first order proportion to the rate of increase in the throttle opening degree ($\Delta$TH), it is possible to effect the correction by a value variable with the second order function or the other function thereof. It is also possible to correct the vehicle speed indicative signal V by a constant if the rate of increase in vehicle speed is greater than a predetermined value.

Figure 24:
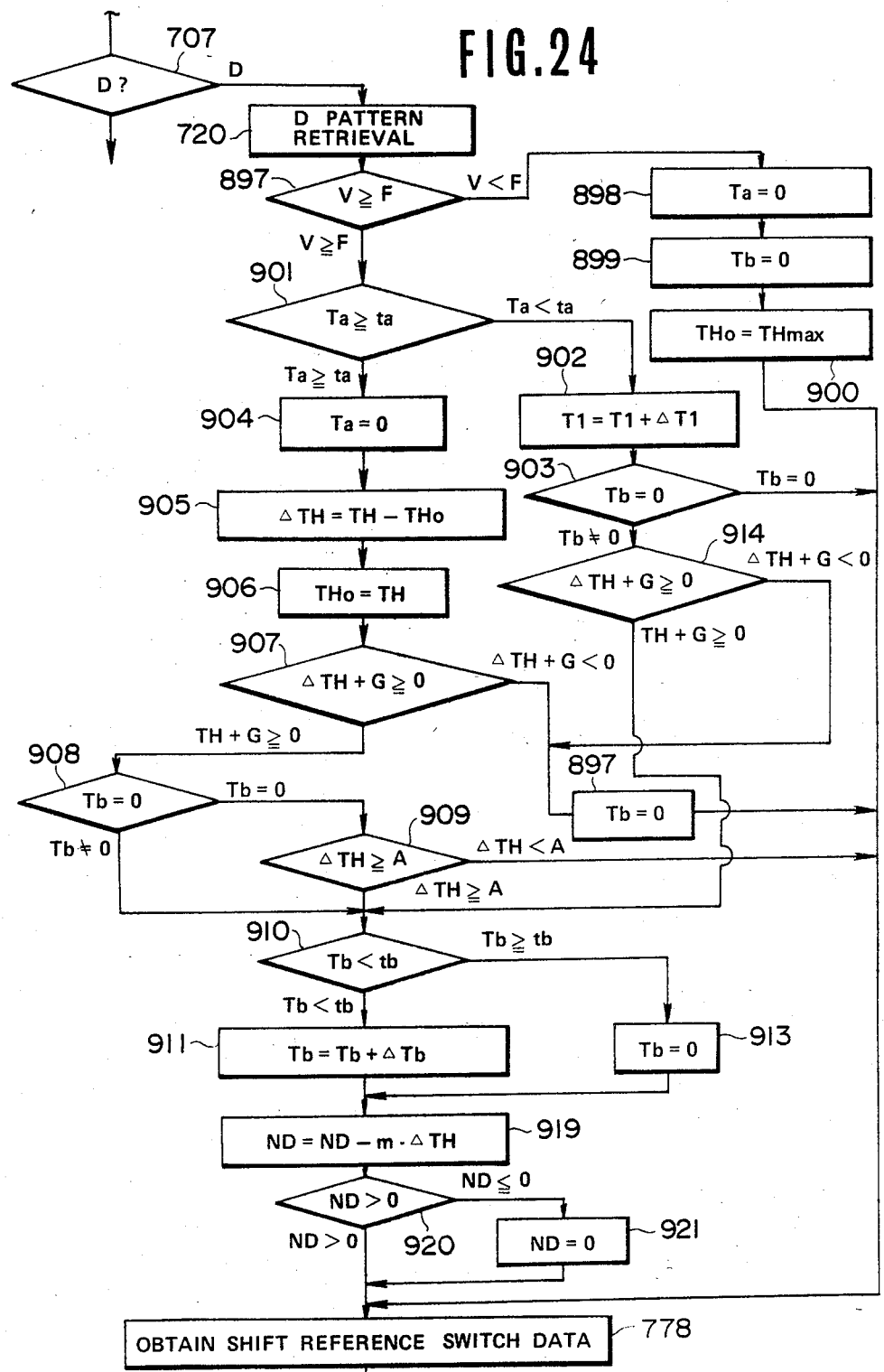
FIG. 24 is a portion of a flow chart of a stepper motor control routine of a third embodiment according to the present invention.

Referring to FIG. 24, a third embodiment is described.

This embodiment results from replacing the steps 707 to 778 of the first embodiment shown in FIGS. 9(a), 9(b) and 9(c) with steps shown in FIG. 24 and provides substantially similar operation and effect to those of the first embodiment by directly correcting the stepper motor pulse number indicative signal ND obtained by retrieving the D pattern retrieval in step 720.

If the D range is selected in step 707, the pulse number indicative signal ND is obtained by retrieving the D range shift pattern in step 720. The processing from step 897 to step 910 is the same as that along the counterparts shown in FIG. 9(c). In step 917, a determination is made whether the timer Tb is less than the reference period of time tb. If Tb is less than tb, the timer Tb is increased by $\Delta$Tb in step 911, and then the pulse number ND is decreased by a value m$\Delta$TH which has resulted from multiplying a coefficient m with $\Delta$TH obtained in step 905. Then, a determination is made whether the pulse number ND is greater than zero (positive) in step 920. If the pulse number ND is less than or equal to zero (negative), the pulse number ND is given zero in step 921, and then the program goes to step 778. If, in step 910, the timer Tb is greater than or equal to zero, the timer Tb is cleared to zero in step 913.

In this embodiment, too, the similar operation and effect to those of the before mentioned embodiment are obtained because the pulse number having been decreased is given upon rapid increase in the throttle opening degree.

Figure 25:
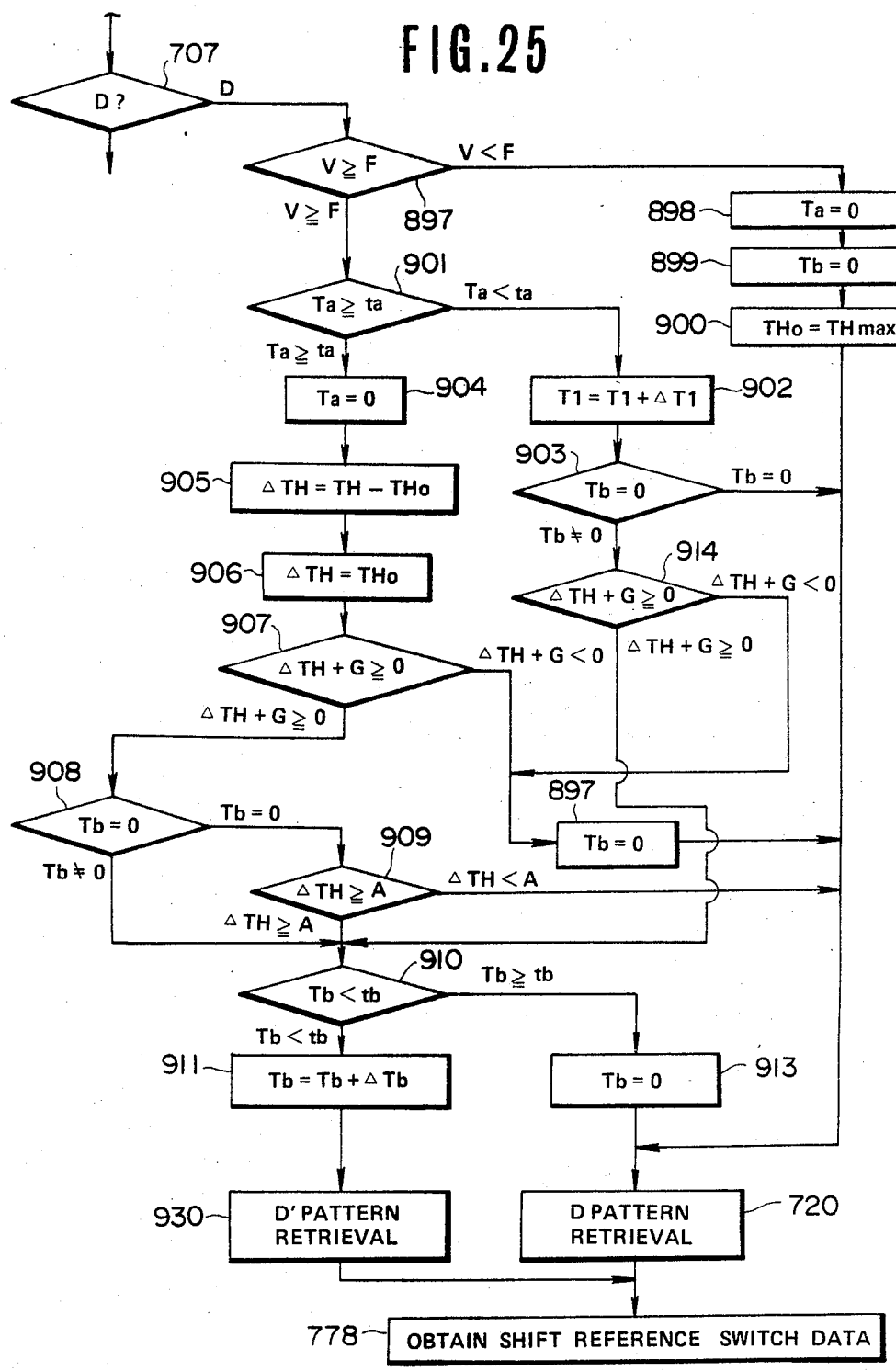
FIG. 25 is a portion of a flow chart of a stepper motor control routine of a fourth embodiment according to the present invention.

Referring to FIG. 25, a fourth embodiment is described.

This embodiment results from replacing the steps from step 707 to step 778 of the first embodiment shown in FIGS. 9(a), 9(b) and 9(c) with steps shown in FIG. 25 and provides substantially similar operation and effect to those of the first embodiment by retrieving a different shift pattern upon rapid increase in the throttle opening degree.

The processing from step 707 to step 910 is substantially similar to that of the first embodiment described in connection with FIG. 9(c). A determination is made in step 910 whether the timer Tb is less than the reference period of time tb. If Tb is greater than or equal to tb, the timer Tb is cleared to zero in step 913, and the normal D range shift pattern is retrieved in step 720 before the program goes to step 778. On the other hand, if, in step 910, Tb is less than tb, the timer Tb is increased by ΔTb in step 911. A corrected and different D range shift pattern (i.e., D′ pattern retrieval) is retrieved in step 930 before the program goes to step 778. Then, the execution of the steps following the step 778 is carried out. The corrected shift pattern is designed to give a reduction ratio larger than that given by the normal shift pattern for the same operating condition. According to this embodiment, too, the reduction ratio larger than the normal reduction ratio is obtained upon rapid increase in the throttle opening degree and provides substantially similar operation and effect to those of the first embodiment.

In the previously desribed embodiments so far described, the depression degree of the accelerator pedal is represented by the throttle opening degree indicative signal, and the reduction ratio is increased upon rapid increase in depression degree of the accelerator pedal, thus ensuring quick acceleration.

In the following fifth embodiment which will be described in connection with FIGS. 9(a), 9(b) and 26, the reduction ratio is controlled to ensure effective engine braking upon rapid decrease in depression degree of the accelerator pedal.

This embodiment is different from the first embodiment described in connection with FIGS. 9(a), 9(b) and 9(c) in steps 1901 to 1936 shown in FIGS. 26(a) and 26(b).

Figure 26A:
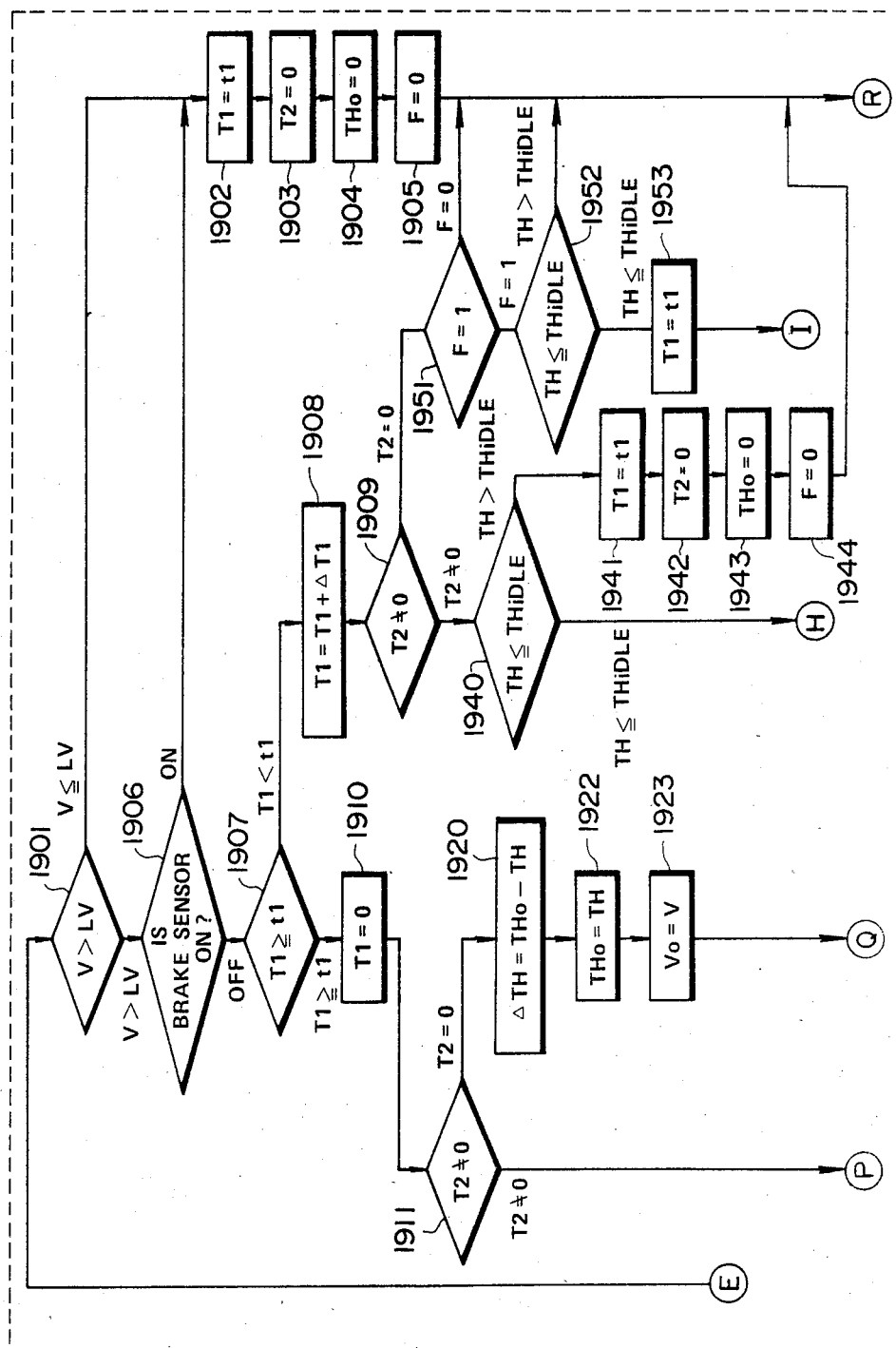

Referring to FIGS. 26(a) and 26(b), with the processing from step 1901 to step 1936, the reduction ratio is held upon rapid decrease in the throttle opening degree. First of all, a determination is made whether the actual vehicle speed V obtained in step 701 (see FIG. 9(a)) is greater than a predetermined reference relatively low vehicle speed value LV in step 1901. If the actual vehicle speed V is lower than the reference value LV, a timer T1 is given a value t1 in step 1902, a timer T2 is given a zero value in step 1903, a preceding routine throttle opening degree THo is zero in step 1904, and a value F which is later described is zero in step 1905. Then, the program goes to step 770 shown in FIG. 9(a) wherein the D range pattern is retrieved. Thus, the throttle opening degree TH and the vehicle V based on which the D range pattern retrieval is carried out are not corrected if the vehicle speed is low or less than or equal to the value LV. Therefore, the normal shift pattern is provided.

If, in the preceing step 1901, the vehicle speed V is greater than the value LV, a determination is made whether the brake sensor 307 is on (applied state) or not (released state). If the brake sensor is in "on", the program goes to the preceding step 1902, thus leaving the throttle opening degree TH and the vehicle speed V as they are (i.e., the normal reduction ratio is obtained after retrieving the D range pattern in step 720). If the brake sensor is in "off", a determination is made whether the time T1 is greater than or equal to the reference period of time or value t1 in step 1907. If the timer T1 is less than the reference value t1, the timer T1 is increased by a small value ΔT1 in step 1908, and then a determination is made in step 1909 whether the timer T2 is equal to zero (T2 is not actuated) or not equal to zero (T2 is actuated).

If, in step 1909, the timer T2 is equal to zero, a determination is made in step 1951 whether or not the value F is equal to 1. If the value F is equal to zero, the program goes to step 720 (see FIG. 9(a)), while if the value F is equal to 1, a determination is made in step 1952 whether or not the throttle opening degree TH is less than or equal to a predetermined small opening degree THiDLE which corresponds to the idle opening degree thereof in the present embodiment. If the throttle opening degree TH is greater than THiDLE, the program goes to step 720 (i.e., the normal reduction ratio is obtained), while if the throttle opening degree TH is less than or equal to THiDILE, the timer T1 is given the value t1 in step 1953 and then the program goes to the later described step 1930 (see FIG. 26(b)). If, in step 1909, the timer T2 is not equal to zero, a determination is made in step 1940 whether or not the throttle opening degree TH is less than or equal to THiDLE. If the throttle opening degree TH is less than or equal to THiDLE, the program goes to step 1930 (see FIG. 26(a)), while if TH is greater than THiDLE, steps 1941, 1942, 1943 and 1944 are executed to set T1=t1, T2=0, THo=0 and F=0 before the program goes to step 720. If, in step 1940 or in step 1952, the throttle opening degree TH is greater than THiDLE, i.e., the engine is not in the idle state, the normal reduction ratio is obtained.

If, in step 1907, the timer T1 is greater than or equal to t1, the timer T1 is given zero in step 1910, and then a determination is made in step 1911 whether the timer T2 is equal to zero (T2 is not actuated) or not equal to zero (T2 is actuated). If T2 is not equal to zero, a determination is made in step 1912 whether or not the throttle opening degree TH is less than or equal to THiDLE. If TH is greater than THiDLE, T2=0, THo=0 and F=0 are set in step 1913, step 1914 and step 1915, respectively, before the program goes to step 720 (see FIG. 9(a)). If, in step 1912, TH is less than or equal to THiDLE, the program goes to step 1930.

If, in step 1911, T2 is equal to zero, a difference ΔTH between the preceding routine throttle opening degree THo and the present routine throttle opening degree TH is computed in step 1920. The execution of this step 1920 is repeated after the elapse of the reference period of time t1 because a flow from the step 1907 to step 1908 switches to another flow from step 1907 to step 1910 each time after the elapse of the reference period of time t1. ΔTH represents the rate of displacement or change in throttle opening degree during the reference period of time t1, i.e., the displacement speed of the throttle valve. If it is negative, ΔTH indicates that the throttle opening degree is decreasing or the depression degree of the accelerator pedal is decreasing. Then, in step 1922, the preceding routine throttle opening degree THo is given the present routine throttle opening degree TH obtained during the present routine for the processing during the next routine. In the next step 1923, the vehicle speed V obtained during the present routine is set as a vehicle speed Vo which is later described. Then a determination is made in step 1926 whether or not ΔTH is greater than or equal to a predetermined reference value C (i.e., in the step 1926 the determination whether the throttle opening degree decreases rapidly), and if ΔTH is less than the predetermined reference value C, the program goes to step 720. The throttle opening degree TH is not corrected and thus the normal reduction ratio is obtained. If, in step 1926, ΔTH is greater than or equal to the value C, a determination is made whether or not the throttle opening degree TH is less than or equal to THiDLE in step 1927. If, in step 1927, TH is greater than THiDLE, F is given 1 in step 1950 before the program goes to step 720. If, in step 1927, TH is less than or equal to THiDLE, a determination is made in step 1930 whether the timer T2 is less than a reference period of time t2. If, in step 1930, T2 is greater than or equal to t2, T2=0, THo=0 and F=0 are set in step 1931, step 1935 and step 1936, respectively. If, in step 1930, the timer T2 is less than Δt2, the timer T2 is increased by a small value T2 in step 1932, and ΔTH is added, in step 1933, to the throttle opening degree THo to result in the throttle opening degree TH. This newly set throttle opening degree TH represents a throttle opening degree during a routine wherein rapid decrease in throttle opening degree was detected. This is because THo is given the throttle opening degree during the present routine in step 1922 and is increased by ΔTH. Subsequently, the vehicle speed V is given the vehicle speed Vo in step 1934. Then, the program goes to step 720. Strictly speaking, the vehicle speed V represents a vehicle speed during the present routine and thus does not represent a vehicle speed obtained during the routine wherein the rapid decrease in the throttle opening degree is detected. But, the reference period of time t1 is from 0.1 sec. to 0.5 sec. and is very short. Thus, the vehicle speed V can be regarded as the vehicle speed obtained during the routine where the rapid decrease in throttle opening degree was detected. It will therefore now be understood that the throttle opening degree TH is held and always represents a value upon detecting rapid decrease in throttle opening degree and the vehicle speed V is substantially the same as the vehicle speed upon detecting the rapid decrease in throttle opening degree, so substantially the same reduction ratio is obtained by retrieving D pattern routine in step 720. In other words, the desired optimum reduction ratio in terms of stepper pulse number ND is held upon detecting rapid decrease in the throttle opening degree.

Figure 27:
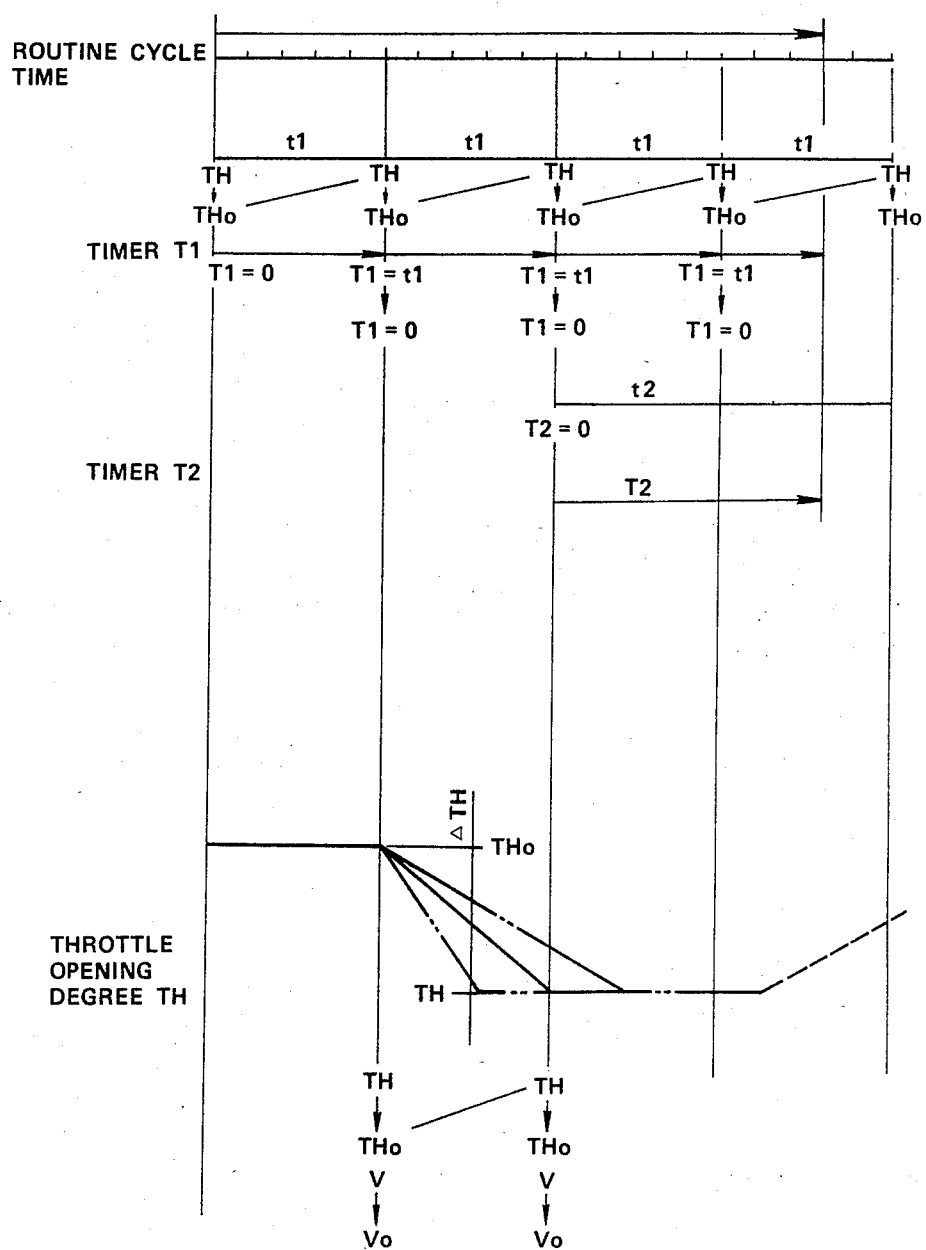
FIG. 27 is a timing digram illustrating the relation between a reference period of time t1 and another reference period of time t2.

Referring to FIG. 27, the relationship between the timer T1 and the reference period of time t1 and that between the timer T2 and the reference period of time t2 are described.

Each time when the timer T1 reaches the reference period of time t1, the flow from the step 1907 to step 1908 switches to the flow from step 1907 to step 1910 and the difference ΔTH between the throttle opening degree TH and the throttle opening degree THo is computed, i.e., the throttle opening degree displacement speed ΔTH. This computation, however, is not carried out while the timer T2 is not equal to zero or is actuated. The timer T2 remains in actuating state for the reference period of time t2 after the routine where the rapid decrease in throttle opening degree was detected (T1=0, T2=0 during this routine) as long as a release signal is abscent. During this period of time, the throttle opening degree TH is corrected to the preceding routine throttle opening degree THo (see steps 1920, 1922 and 1933) and the D range pattern retrieval is carried out based on this corrected throttle opening degree. Under a condition when the timer T2 is not equal to zero and thus is in actuating state, if the throttle opening degree TH is increased as a result of depressing the accelerator pedal, it is determined in step 1940 that TH is greater than THiDLE and thus the program goes along step 1941 to step 1944. As a result, the control to hold the reduction ratio is released. This control may be released also when the vehicle speed V becomes less than or equal to LV (see step 1901) or the brake pedal is depressed (see step 1906).

In summary, with the processing along steps 1901 to 1936, if the throttle opening degree is released to the idle state under a condition where the vehicle speed is greater than the predetermined value and at the same time the brake pedal is not depressed, the reduction ratio obtained upon detecting the rapid release of the throttle opening degree is maintained for the reference period of time (a flow along steps 1901→1906→1907→1910→1911→1920→1922→1923→1926→1927→1930→1932→1933→1934→720, a flow along steps 1901→1906→1907→1910→1911→1912→1930→1932→1933→1934→720, a flow along steps 1901→1906→1907→1908→1909→1940→1930→1932→1933→1934→720, and a flow along steps 1901→1906→1907→1908→1909→1951→1952→1953→1930→1932→1933→1934→720). The above mentioned state is released in the following cases, i.e., when the vehicle speed is low (a flow along steps 1901→1902→1903→1904→1905→720), when the brake pedal is depressed (a flow along steps 1901→1906→1902→1903→1905→720), when the accelerator pedal is depressed (a flow along steps 1940→1941→1942→1943→1944→720, a flow along steps 1952→720, a flow along steps 1912→1913→1914→1915) and when the reference period of time has elapsed (a flow along steps 1930→1931→1935→1936→720).

What is contemplaced by step 1950 wherein F is given 1 and the subsequent step 1951 wherein whether F is equal to 1 is determined is to prevent the execution of the control of holding the reduction ratio when the throttle opening degree has not reached the idle state even if the decrease in the throttle opening degree is rapid enough and to carry out the control right after the throttle opening degree reaches the idle state (a flow along steps 1951→1952→1953→1930→1932→1933→1934).

Referring to FIGS. 28(a), 28(b) 28(c)-1 and 28(c)-2, a sixth embodiment is described.

This embodiment provides substantially similar operation and effect to those obtained by the fifth embodiment except that the pulse number ND is given a pulse number NL which is obtained during the past routine where rapid decrease in throttle opening degree was detected.

The processing along step 701 to step 707 is substantially similar to that along the counterparts (see FIG. 9(a)) of the fifth embodiment except the provision of a step 702 wherein the engine revolution speed NE is obtained from engine revolution speed sensor 301 (see FIG. 4). The step 702 is executed after step 701 and is followed by step 703. If, in step 707, the D range is selected, the D range shift pattern is retrieved in step 720 shown in FIG. 28(a). Then, the program goes to step 1901 shown in FIG. 28(c)-1. Referring to FIGS. 28(c)-1 and 28(c)-2, the processing from step 1901 to step 1936 are substantially similar to the counterparts shown in FIG. 26 except that steps 1923, 1933 and 1934 shown in FIG. 26 have been removed and new steps 1001 and 1002 are provided between step 1927 and step 1930 and new step 1003 os provided after step 932 as shown in FIG. 28(c)-2. Therefore, the emphasis of the following description is placed on the difference from the fifth embodiment. Each time after the elapse of the reference period of time t1, ΔTH is computed in step 920. If the throttle opening degree decreases rapidly to the idle state thereof in steps 1926 and 1927, an actual reduction ratio iL is obtained in step 1001. The reduction ratio iL is obtained by computing the equation $iL = k \cdot NE/V$ (where k: a constant determined by the final reduction ratio and tire effective diameter). Then, a stepper motor pulse number NL corresponding uniquely to the actual reduction ratio iL is obtained in step 1002. A pulse number corresponding uniquely to an actual reducation ratio is obtained by using the relation shown in FIG. 18. After the step 1002, if the program goes along step 1930 and step 1932 to step 1003, the pulse number ND obtained by the D pattern retrieval in step 720 is given the pulse number NL which is fixed. As a result of the execution of step 1003, the pulse number ND is always given the pulse number NL corresponding to the actual reduction ratio iL which is computed during a routine where rapid decrease in throttle opening degree is detected. As a result, the reduction ratio is kept at the same reduction ratio for the reference period of time. Accordingly, if the execution of step 1003 is repeated after an instance when the throttle opening degree is decreased rapidly to the idle state under a condition where the vehicle speed is greater than a predetermined value and the brake pedal is not depressed, the reduction ratio is maintained for the predetermined period of time, while, otherwise the reduction ratio is determined based on the pulse number obtained by retrieval in step 720. Apparently, this provides substantially similar operation and effect to those of the fifth embodiment.

Although the fifth and sixth embodiments of the present invention have been applied to the continuously variable V-belt transmission, the fifth and sixth embodiments particularly sixth embodiment may be applied to an automatic transmission using a gearing and having a plurality of distinct reduction ratios. This can be done by simply applying steps 1901 to 1936 shown in FIGS. 28(c)-1 and 28(c)-2 to the control device of the automatic transmission of the type wherein the reduction ratio is determined in response to two values obtained by detecting throttle opening degree and vehicle speed in terms of electric signals. When the accelerator pedal is rapidly released, the reduction ratio determined by the throttle opening degree and vehicle speed signals obtained right before the rapid release of the accelerator pedal is held for a predetermined period of time.

Figure 28:
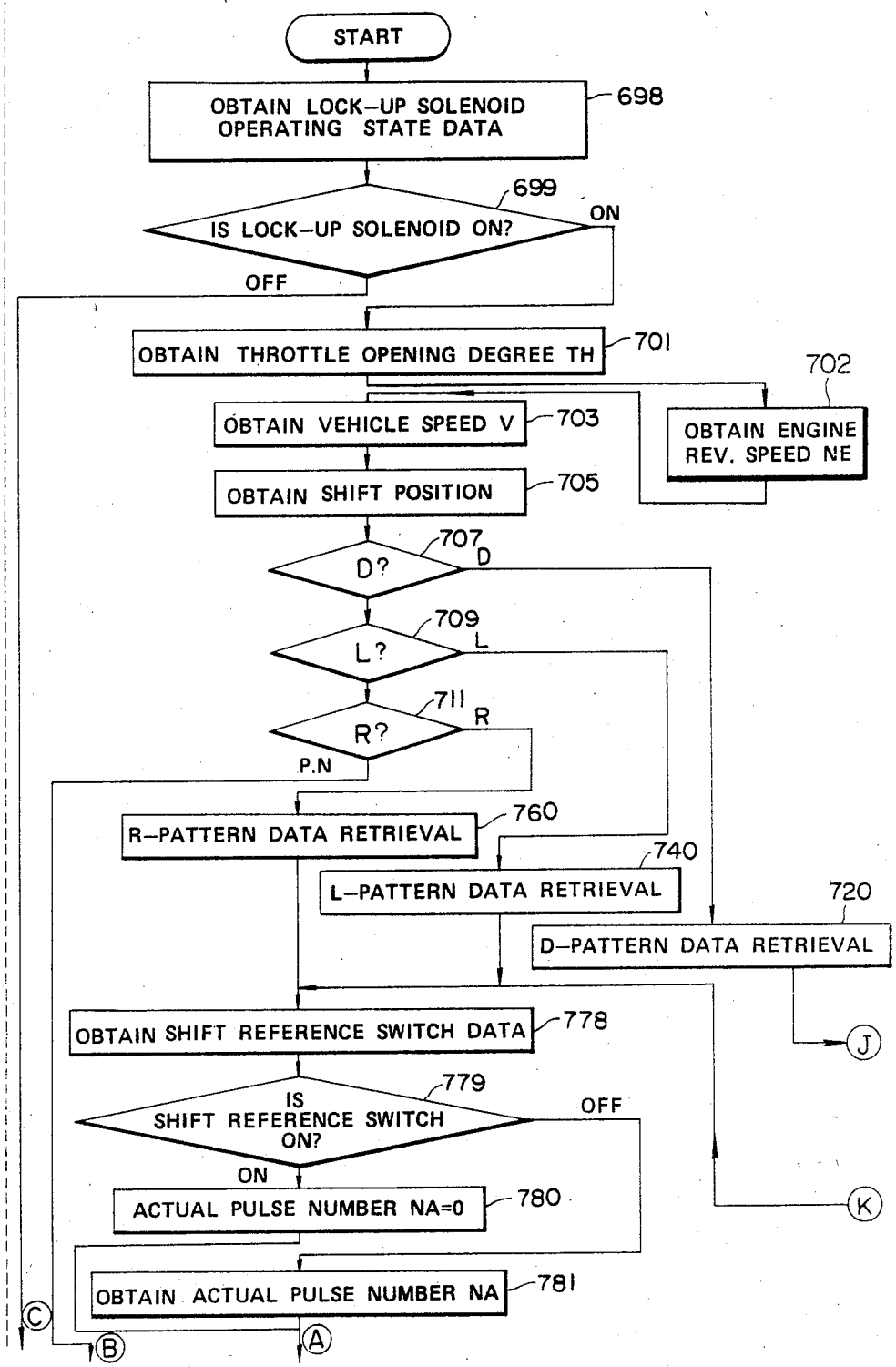
Figure 28B:
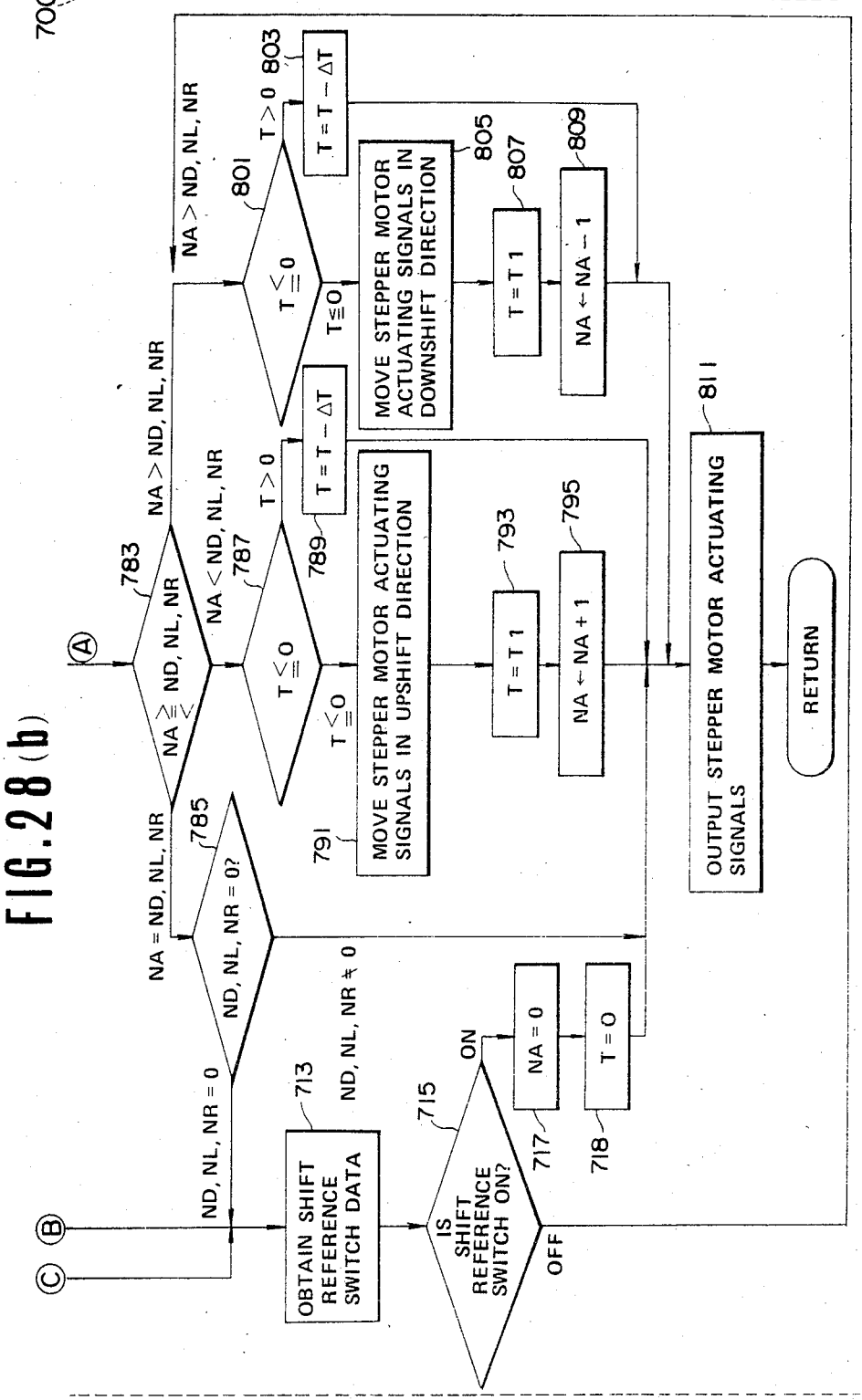
Figures 1, 28C:
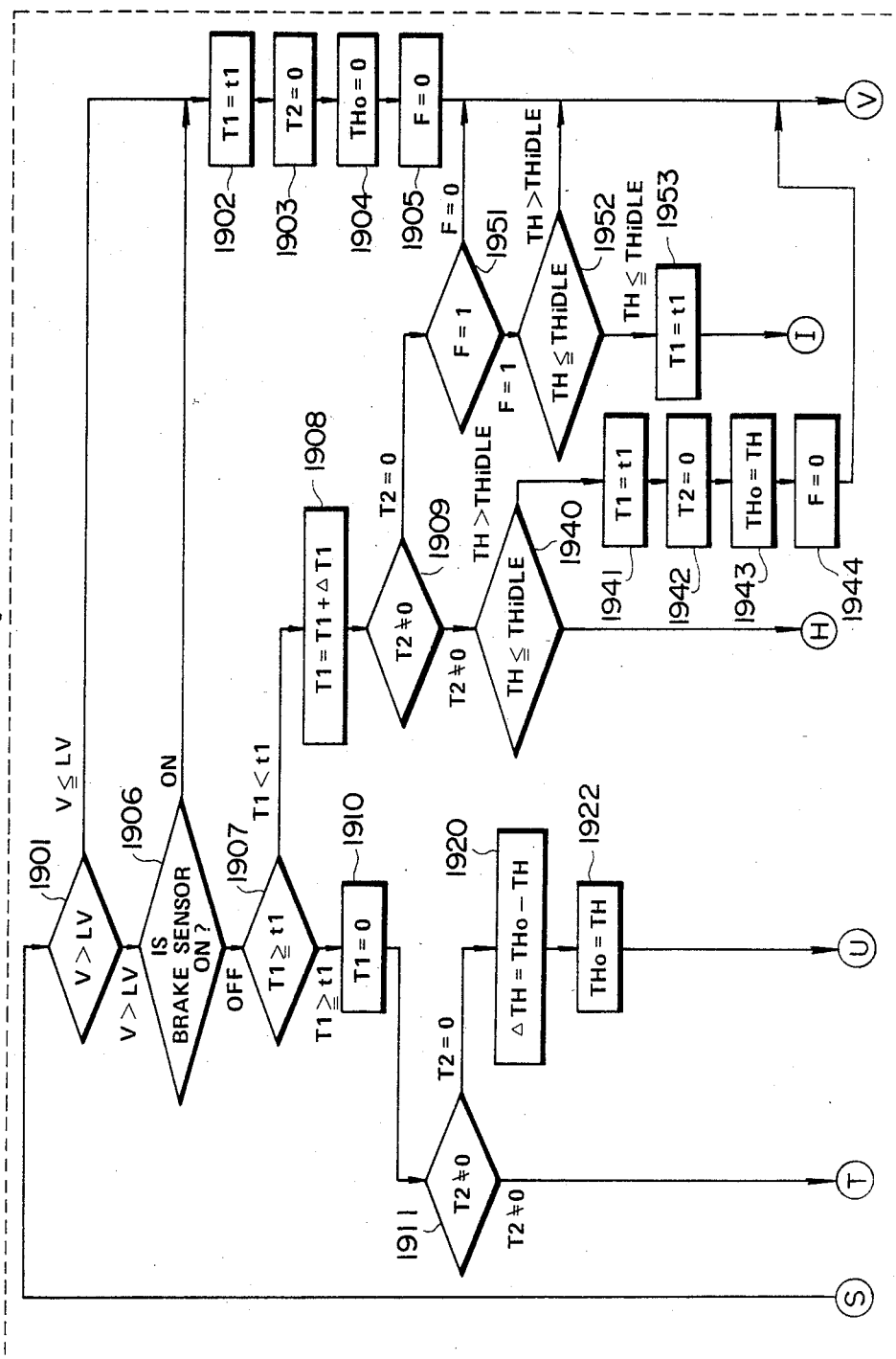

Referring to FIG. 29 in combination with FIGS. 28(a) and 28(b), a seventh embodiment is described.

Figure 29A:
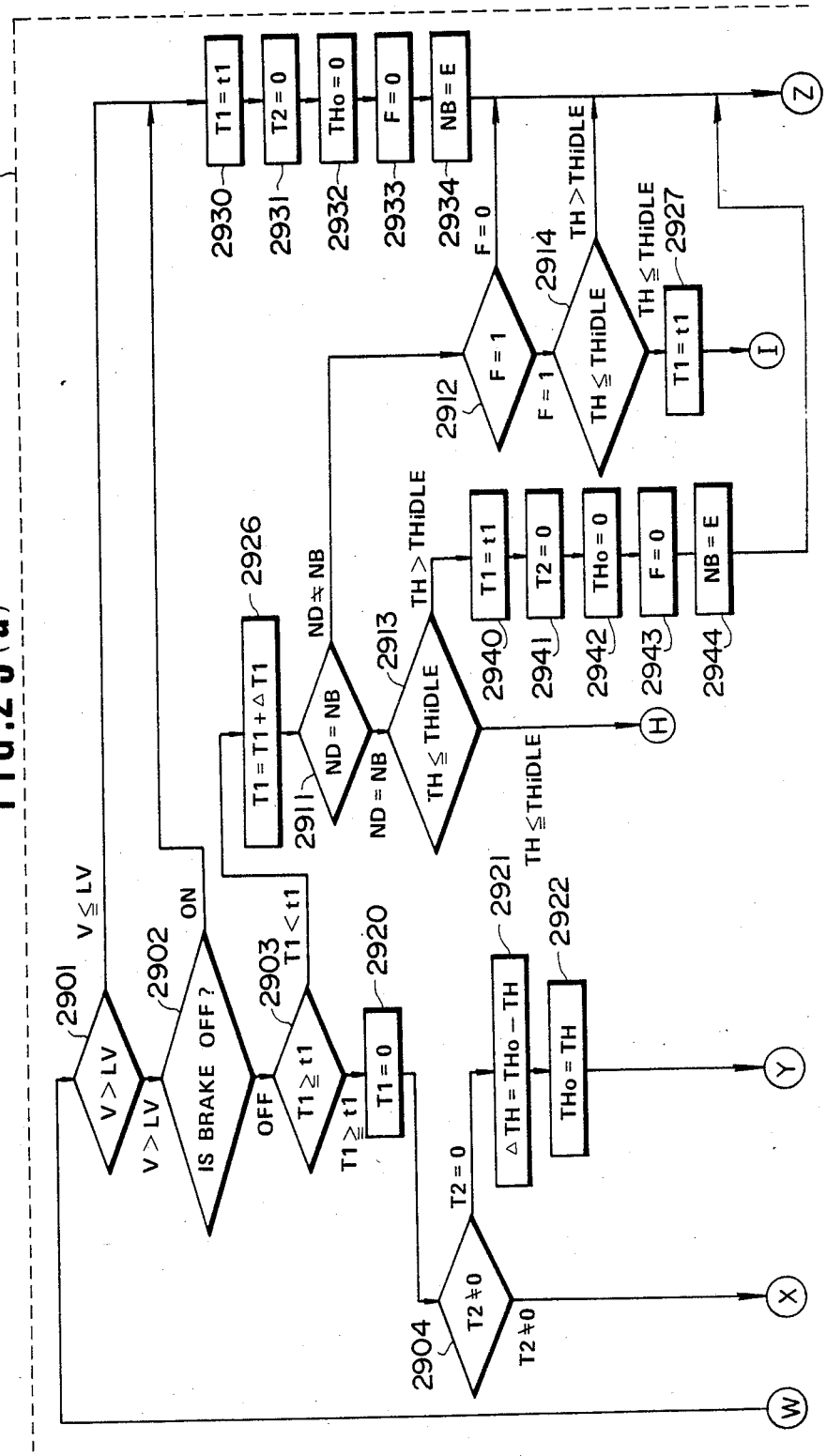
FIGS. 29(a) and 29(b) are a similar view to FIGS. 28(c)-1 and 28(c)-2 showing a portion of a flow chart of a stepper motor control routine of a seventh embodiment according to the present invention.
Figure 29B:
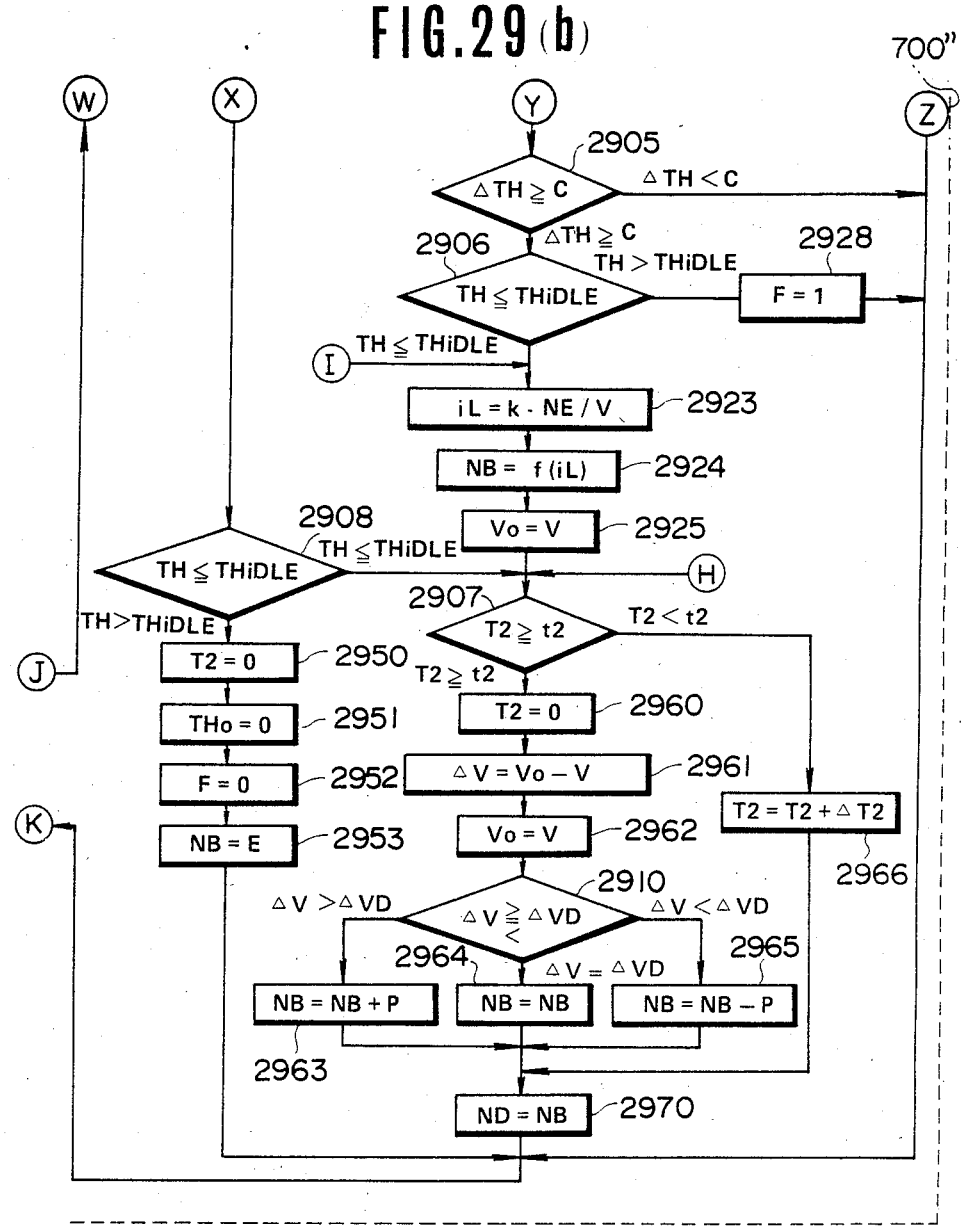

This embodiment is similar to the sixth embodiment shown in FIGS. 28(a), 28(b), 28(c)-1 and 28(c)-2 except that the steps shown in FIGS. 28(c)-1 and 28(c)-2 are replaced with steps shown in FIGS. 29(a) and 29(b). Thus, the following description focus on the steps shown in FIGS. 29(a) and 29(b).

After the D range shift pattern retrieval routine in step 720 shown in FIG. 28(a), the program goes to step 2901. With the processing from step 2901 to step 2970 shown in FIG. 29, the vehicle deceleration is kept constant after rapid decrease in throttle opening degree which corresponds to accelerator pedal depression degree. First of all, a determination is made in step 2901 whether an actual vehicle speed V is greater than a predetermined low vehicle speed LV. If the actual vehicle speed V is lower than or equal to the predetermined low vehicle speed LV, a timer T1 which is later described is given a reference period of time t1 in step 2930, a timer T2 which is later described is given zero in step 2931, and a preceding routine throttle opening degree THo is given zero in step 2932, F which is later described is given zero in step 2933 and NB which is later described is given a predetermined value E in step 2934, and then the program goes to step 778 (see FIG. 28(a)). As a result, when the vehicle speed V is low, the pulse number ND is not corrected and the normal reduction ratio is controlled to agree with the pulse number ND obtained by step 720.

If, in the previously described step 2901, V is greater than LV, a determination is made in step 2902 whether the brake sensor 307 is in "on" (brake pedal being depressed) or "off" (the brake pedal being relesed). If, in step 2902, the brake sensor is in "on", the program goes to the step 2930 and its subsequent steps, thus providing the normal reduction ratio. If the brake sensor is in "off", a determination is made whether the timer T1 is greater than the reference period of time t1 in step 2903. If T1 is less than t1, the timer T1 is increased by ΔT1 in step 2926, and a decision is made in step 2911 whether the pulse number ND is equal to the pulse number NB. If the pulse number ND is not equal to NB, a determination is made in step 2912 whether F is given 1 in step 2912. If F is equal to zero, the program goes to step 778 (see FIG. 28(a)), while if F is equal to 1, a determination is made in step 2914 whether or not the throttle opening degree TH is less than or equal to THiDLE. If TH is greater than THiDLE, the program goes to step 778, thus providing the normal reduction ratio. If TH is less than or equal to THiDLE, the timer T1 is given the reference period of time t1 in step 2927 before the program goes to the later described step 2923. If, in step 2911, ND is equal to NB, a determination is made in step 2913 whether or not the throttle opening degree TH is less than or equal to THiDLE. If TH is less than or equal to THiDLE, the program goes to the later described step 2907, while if TH is greater than THiDLE, T1=t1, T2=0, THo=0, F=0, NB=E are set in step 2940, step 2942, step 2942, step 2943 and step 2944, respectively. Therefore, if, in step 2913 or step 2914, the throttle opening degree TH is greater than the idle position THiDLE, the normal reduction ratio is always obtained.

If, in step 2903, T1 is greater than or equal to t1, the timer T1 is given zero in step 2920, and then a determination is made in step 2904 whether a timer T2 is equal to zero (T2 is not actuated) or is equal to zero (T2 is not actuated). If T2 is not equal to zero, a determination is made whether the throttle opening degree T2 is less than or equal to THiDLE in step 2908. If TH is greater than THiDLE, TH2=0, THo=0, F=0, NB=E are set in step 2950, step 2951, step 2952 and step 2953, respectively, before the program goes to step 778. If TH is less than or equal to THiDLE, the program goes to the later described step 2907.

If, in step 2904, T2 is equal to zero, a difference ΔTH between the preceding throttle opening degree THo and the present throttle opening degree TH is computed in step 2921. The execution of this step 2921 is repeated after the elapse of the reference period of time t2 because a flow from step 2903 to step 2926 switches to a flow from step 2903 to 2920 after elapse of the reference period of time t1. In the subsequent step 2922, the preceding routine throttle opening degree THo is given the throttle opening degree TH obtained during the present routine. Then, a determination is made in step 2905 whether the throttle opening degree displacement speed ΔTH is greater than or equal to a predetermined reference value C (i.e., whether the throttle opening degree is decreasing rapidly). If ΔTH is less than C, the program goes to step 778. That is, the pulse number ND is not corrected and the normal reduction ratio is obtained. If, in step 2905, ΔTH is greater than or equal to C, a determination is made in step 2906 whether or not the present throttle opening degree TH is less than or equal to THiDLE. If TH is greater than THiDLE, F is given 1 in step 2928 before the program goes to step 778. If, in step 2906, TH is less than or equal to THiDLE, a reduction ratio iL is obtained in step 2923 by computing the equation $iL = k \cdot NE/V$ (where: k, constant). In the subsequent step 2924, a stepper motor pulse number NB is obtained which corresponds uniquely to and is a predetermined relationship with the actual reduction ratio iL. In the next step 2925, the preceding vehicle speed Vo is given the vehicle speed obtained in the present routine. Then, in step 2907, the determination is made whether the timer T2 is greater than or equal to a reference period of time t2. If T2 is greater than or equal to t2, T2 is given zero in step 2960 before the program goes to step 2961. If T2 is less than t2, the timer T2 is increased by a small value ΔT2 in step 2966, then, in step 2970, the pulse number ND is given the pulse number NB obtained in step 2924 before the program goes to step 778. In step 2961, a difference ΔV is obtained between the vehicle speed Vo obtained the reference period time t2 ago and the vehicle speed V obtained during the present routine, the difference if positive indicating deceleration.

Next, the vehicle speed Vo is given the vehicle speed V obtained during the present routine in step 2962. Then, the actual deceleration ΔV is compared with a predetermined deceleration value ΔVD in step 2910. If, in step 2910, ΔV is greater than ΔVD, the pulse number NB is increased in step 2963 by a constant P (i.e., the increasing of the pulse number NB results in a decrease in reduction ratio). If, in step 2910, ΔV is less than ΔVD, the pulse number NB is decreased in step 2965 by the constant P (i.e., the decreasing the pulse number NB results in an increase in reduction ratio). If, in step 2910, ΔV is equal to ΔVD, NB is left as it is in step 2964. After step 2963 or step 2964 or step 2965, the program goes to step 2970 where ND is given NB. Then, the program goes to step 778.

With the steps 2901 to 2970, a flow from step 2903 to step 2926 switches to a flow from step 2903 to step 2920 each time when the timer T1 reaches the reference period of time t1 and a difference between the throttle opening degree obtained the reference period of time t1 ago and the present throttle opening degree TH is computed, i.e., the throttle opening degree displacement speed ΔTH is computed. However, ΔTH is not computed as long as the timer T2 is not equal to zero and thus is actuated because the the program always goes to step 2908 after step 2904. The timer T2 is kept actuted for the reference period of time t2 after the routine where the rapid deceleration in the throttle opening degree was deteched (T1=0, T2=0) as long as the release signal is absent. The stepper motor pulse number is corrected in a manner such as to let the actual deceleration ΔV agree with the desired deceleration before the reference period of time t2 has elapsed, and the reduction ratio is controlled in response to this corrected stepper motor pulse number. If the throttle opening degree is increased as a result of depression of the accelerator pedal while the timer T2 remains actuated, it is determined that TH is greater than THiDLE in step 2913 and thus the program proceeds along step 2940 to step 2944, thus releasing the control to keep the deceleration constant. The reference period of time t2 is n times longer the reference period of time t1, where n is a natural number. The control to keep the deceleration constant may be released when throttle opening degree is increased or the vehicle speed is lower than (step 2901) or the brake pedal is depressed (step 2902).

In summary, with steps from step 2901 to step 2970, a predetermined deceleration state is maintained during operation state when the engine brake is needed, i.e., when the throttle opening degree is rapidly decreased to an idle state in a state when the vehicle speed is higher than the predetermined value and the brake is not depressed (steps 2901→2902→2903→2920→2904→2921→2922→2905→2906→2923→2924→2925→2907→2960~2970→778, steps 2901→2902→2903→2920→2904→2908→2907→2960-~2970→778, step 2901→2902→2903→2926→2911→2913→2907→2960-~2970→778, and steps 2901→2902→2903→2926→2911→2912→2914→2927→2923→2924→2925→2907→2960~2970→778). Since a predetermined deceleration state is selected if the throttle opening degree is rapidly returned as mentioned above, the frequency to suspend the later described reduction ratio control designed to minimize the fuel consumption rate can be minimized, thus ensuring the benefit of the continuously variable transmission. The above mentioned state is released in the following cases, i.e., when the vehicle speed is low (steps 2901→2930→2931→2932→2933→2934→778), when the brake is depressed (steps 2901→2902→2930→2931→2933→2934→778), when the accelerator pedal is depressed (steps 2913→2940→2941→2942→2943→2944→778, steps 2914→778, steps 2906→2928→778, steps 2908→2950→2951→2952→2953→778).

What is intended by setting F being equal to 1 at step 2928 and the decision is made whether F is equal to 1 in step 2912 is to prevent the control to keep the reduction ratio constant from taking place before the throttle opening degree reaches the idle state even though the throttle opening degree decreases rapidly (steps 2905→2906→2928), and if subsequently the throttle opening degree has reached the idle state such control takes place immediately (steps 2912→2914→2927→2923→2924→2925→2907). Since the correction is carried out in steps 2910, 2963, 2964 and 2965, a preferrable deceleration is kept even if there is a variation in gradient while travelling down a slope.

Figure 30:
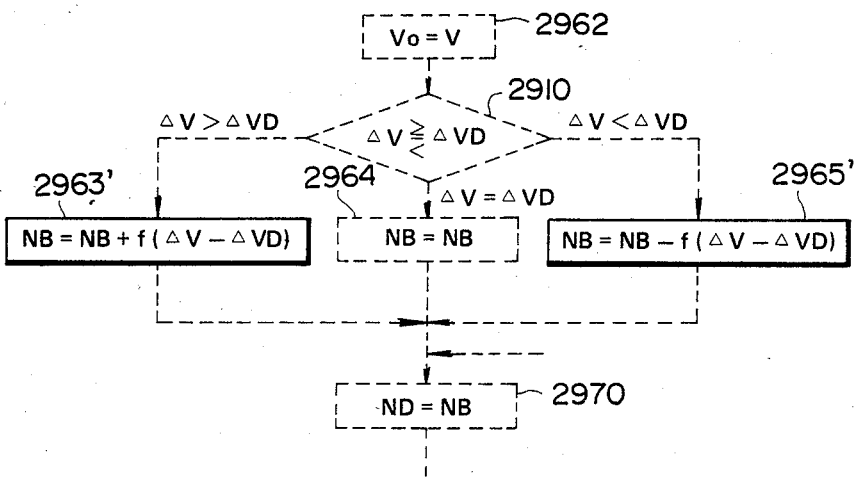
FIG. 30 is a portion of a flow chart of a stepper motor control routine of an eighth embodiment according to the present invention.

Referring to FIG. 30, an eighth embodiment is described.

This embodiment results from replacing steps 2963 and 2965 of the seventh embodiment shown in FIG. 29(b) with steps 2963' and 2965' and the other portion is substantially similar to the counterparts thereof. If, in step 2910, $\Delta V$ is greater than $\Delta VD$, a pulse number determined by a function having as a variable a difference between the actual deceleration $\Delta V$ and a desired deceleration $\Delta VD$, i.e., $f(\Delta V - \Delta VD)$, is added to a pulse number NB in step 2963'. With this, the more the difference between the actual deceleration and the desired deceleration increases, the more the pulse number increases, and thus the desired deceleration is accomplished quickly. While, in step 2965', a pulse number determined by a function $f(\Delta V - \Delta VD)$ is decreased from the pulse number NB if $\Delta V$ is less than $\Delta VD$ in step 2910. With this, the desired deceleration is accomplished quicker.

Figure 31:
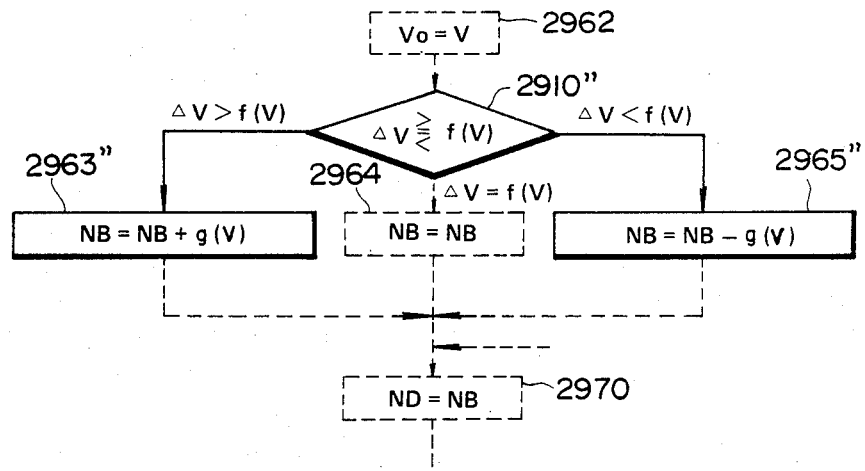
FIG. 31 is a portion of a flow chart of a stepper motor control routine of a ninth embodiment according to the present invention.

Finally, a ninth embodiment is described in connection with FIG. 31.

This embodiment results from replacing steps 2910, 2963 and 2965 of the seventh embodiment shown in FIGS. 29(a) and 29(b) with steps 2910", 2963" and 2965", respectively, and the other portion is substantially similar to the counterparts of the seventh embodiment. In step 2901", a value determined by a function having as a variable vehicle speed V, i.e., f(V), is used as a desired deceleration with which an actual deceleration $\Delta V$ is compared. With this, an appropriate deceleration can be set depending upon the vehicle speed V, thus enhancing the ride feeling. At steps 2963" and 2965", a pulse number NB is corrected by a value determined by a function having as a variable vehicle speed V, i.e., g(V). Accordingly, the rate of speed at which the desired deceleration is accomplished varies depending upon the vehicle speed, thus ensuring more smooth control.

What is claimed is:

1. A method from controlling a reduction ratio of a continuously variable transmission of an automotive vehicle having a brake pedal and an internal combustion engine with an accelerator pedal, comprising the steps of:
generating an engine load change speed indicative signal representing the speed of a change in load applied to the internal combustion engine;
comparing said engine load change speed indicative signal with a predetemined reference and generating a comparison result indicative signal when said engine load change indicative signal satisfies a predetermined relationship with said predetermined reference;
detecting at least one operating condition of the automotive vehicle;
executing a first routine where a first desired optimum reduction ratio is determined for the detected operating condition of the automotive vehicle and an actual reduction ratio of the continuously variable transmission is adjusted toward said first desired optimum reduction ratio;
repeating said first routine executing step; and
interrupting said first routine executing step after a predetermined condition has been satisfied and executing a second routine where a second desired optimum reduction ratio is determined for the detected operating condition of the automotive vehicle and the actual reduction ratio of the continuously variable transmission is adjusted toward said second desired reduction ratio, said predetermined condition involving generation of said comparison result indicative signal.

2. A method as claimed in claim 1, further comprising:
generating a vehicle speed indicative signal representing a vehicle speed of the automotive vehicle; and
generating an engine load indicative signal representing a load on the internal combustion engine, wherein said at least one operating condition is represented by the vehicle speed indicative signal and the engine load indicative signal.

3. A method as claimed in claim 2, wherein, said second desired optimum reduction ratio obtained in said first routine is larger than said first desired optimum reduction ratio otherwise obtained for the same detected operating condition.

4. A method as claimed in claim 3, wherein, in said second routine,
a correction is carried out by a value determined by a predetermined function having as a variable the engine load change speed indicative signal to generate a second desired optimum reduction ratio indicative signal representing said second desired optimum reduction ratio.

5. A method as claimed in claim 3, wherein, in said second routine,
a correction is carried out by a constant value to generate a second desired optimum reduction ratio indicative signal representing said second desired optimum reduction ratio.

6. A method as claimed in claim 3, wherein desired optimum reduction ratio data are stored in a memory for a set of the engine load indicative signal and the vehicle speed indicative signal, and wherein, in said second routine a second desired optimum reduction ratio indicative signal representing said second desired optimum reduction ratio it obtained by correcting said engine load indicative signal before retrieving said desired reduction ratio data using said engine load indicative signal corrected.

7. A method as claimed in claim 3, wherein desired optimum reduction ratio data are stored in a memory for a set of the engine load indicative signal and the vehicle speed indicative signal, and wherein, in said second routine, a second desired optimum reduction ratio indicative signal representing said second desired optimum reduction ratio is obtained by correcting said vehicle speed indicative signal before retrieving said desired data using said corrected vehicle speed indicative signal.

8. A method as claimed in claim 3, wherein desired optimum reduction ratio data are stored in a memory for a set of the engine load indicative signal and the vehicle speed indicative signal, and wherein, at least when the engine load change speed indicative signal is at least equal to the predetermined reference, a second desired optimum reduction ratio indicative signal representing said second desired reduction ratio is obtained by correcting said first desired optimum reduction ratio indicative signal obtained by retrieving the desired optimum reduction ratio indicative signal data.

9. A method as claimed in claim 3, wherein first desired optimum reduction ratio data are stored in a memory for a set of the engine load indicative signal and the vehicle speed indicative signal and second desired optimum reduction ratio data are stored in the memory for a set of the engine load indicative signal and the vehicle speed indicative signal, and wherein, in said first routine, said first desired reduction ratio is obtained by retrieving said first desired optimum reduction ratio data and, in said second routine, said second desired reduction ratio is obtained by retrieving said second optimum reduction ratio data.

10. A method as claimed in claim 2, wherein, said predetermined condition is satisfied when the vehicle speed indicative signal is at least equal to a predetermined vehicle speed value and the engine load change speed indicative signal is at least equal to said predetermined reference, and said second desired optimum reduction ratio obtained in said second routine is larger than said first desired optimum reduction ratio otherwise obtained in said first routine for the same detected operating condition.

11. A method as claimed in claim 1, wherein said second routine executing step is repeated and said second desired optimum reduction ratio indicative signal is held as long as a release signal is absent for a first predetermined period of time after said predetermined condition has been satisfied.

12. A method as claimed in claim 11, further comprising:
generating a vehicle speed indicative signal representing a vehicle speed of the automotive vehicle; and
generating an engine load indicative signal representing a load on the internal combustion engine, wherein said at least one operating condition is represented by the vehicle speed indicative signal and the engine load indicative signal and said predetermined condition involves that said engine load indicative signal is less than a predetermined value.

13. A method as claimed in claim 11, wherein the desired optimum reduction ratio held for the first predetermined period of time represents a desired optimum reduction ratio.

14. A method as claimed in claim 12, wherein the release signal is generated when the vehicle speed indicative signal is less than or equal to a predetermined vehicle speed value.

15. A method as claimed in claim 11, wherein the release signal is generated when the brake pedal is depressed.

16. A method as claimed in claim 11, wherein the release signal is generated when the accelerator pedal depression degree indicative signal is greater than the predetermined accelerator pedal depression degree value.

17. A method as claimed in claim 11, wherein the engine load change speed indicative signal is obtained by computing a difference in the engine load indicative signal obtained each time after the elapse of a second predetermined period of time.

18. A method as claimed in claim 17, wherein the second predetermined period of time is shorter than the first predetermined period of time.

19. A method as claimed in claim 12, wherein desired optimum reduction ratio data are stored in a memory for a set of the engine load indicative signal and the vehicle speed indicative signal.

20. A method as claimed in claim 19, wherein, in said second routine,
the vehicle speed indicative signal is held for the first predetermined period of time after said predetermined condition has been satisfied to generate the same vehicle speed indicative signal; and
said desired optimum reduction ratio data are retrieved based on the same vehicle speed indicative signal generated and the engine load indicative signal for said first predetermined period of time to keep a second desired optimum reduction ratio indicative signal substantially the same.

21. A method as claimed in claim 19, including:
generating an engine revolution speed indicative signal representing the engine revolution speed;
retrieving the desired optimum reduction ratio signal data based on the engine load indicative signal and the vehicle speed indicative signal to obtain the desired optimum reduction ratio indicative signal;
computing a predetermined equation having as variables the engine revolution speed indicative signal and the vehicle speed indicative signal which are obtained to provide an actual reduction ratio;
generating an actual reduction ratio indicative signal which corresponds to said actual reduction ratio and has a predetermined relation with same; and
giving as said second desired optimum reduction ratio said actual reduction ratio for the first predetermined period of time.

22. A method as claimed in claim 11,
wherein, in said second routine, a deceleration of the automotive vehicle is detected from said vehicle speed indicative signal to generate a deceleration indicative signal,
and said second desired optimum reduction ratio which is held after said predetermined condition has been satisfied is corrected by a predetermined value until the deceleration indicative signal agrees with a predetermined deceleration value.

23. A method as claimed in claim 22, wherein the predetermined deceleration value is determined by a function having as a variable the vehicle speed indicative signal.

24. A method as claimed in claim 22, wherein said predetermined value by which said second desired optimum reduction ratio indicative signal is corrected is determined by a function having as a variable a difference between the deceleration indicative signal and a desired deceleration.

25. A method as claimed in claim 22, wherein the value by which said second desired reduction ratio indicative signal is corrected is determined by a function having as a variable the vehicle speed indicative signal.

26. A method as claimed in claim 22, wherein the release signal is generated when the vehicle speed indicative signal is less than or equal to a predetermined vehicle 27. A method as claimed in claim 22, wherein the release signal is generated when the brake pedal is depressed.

28. A method as claimed in claim 22, wherein the release signal is generated when the accelerator pedal depression indicative signal is greater than a predetermined accelerator pedal depression value.

29. A method as claimed in claim 22, wherein said engine load change speed indicative signal is obtained by computing a difference in the throttle opening degree indicative signal obtained each time after the elapse of a second predetermined period of time and said vehicle speed deceleration indicative signal is obtained by computing a difference in the vehicle speed indicative signal obtained each time after the elapse of the second predetermined period of time.

30. A method as claimed in claim 29, wherein the second predetermined period of time is shorter than the first predetermined period of time.

31. An apparatus for controlling a reduction ratio of a continuously variable transmission of an automotive vehicle having a brake pedal and an internal combustion engine with an accelerator pedal, comprising:
    means for detecting an engine load of the internal combustion engine and generating an engine load indicative signal representing the engine load detected;
    means for detecting a parameter indicative of operating condition of the automotive vehicle and generating a parameter indicative signal; a control unit receiving inputs including said engine load indicative signal and said parameter indicative signal and generating an output signal, said control unit including a read only memory storing programs performing the steps of computing a change in the engine load indicative signal, comparing said change with a reference and generating a comparison result signal when said change attains a predetermined relationship with said reference; executing a first routine where a first desired optimum reduction ratio is determined for said engine load indicative signal and said parameter indicative signal; repeating said first routine executing step; and interrupting said first routine executing after a predetermined condition has been satisfied involving that said comparison result signal is generated and executing a second routine where a second desired optimum reduction ratio is determined for said engine load indicative signal and said parameter indicative signal; and
    means for adjusting the actual reduction ratio of the continuously variable transmission toward a value which agrees with one of said first and second desired optimum reduction ratio in response to said output signal of said control unit.

32. An apparatus as claimed in claim 31, wherein said parameter indicative signal is a vehicle speed indicative signal indicative of a vehicle speed of the automotive vehicle.

33. A method for controlling a reduction ratio of a continuously variable transmission of an automotive vehicle having an internal combustion engine with a throttle valve which opens in degrees, said method comprising the steps of:
    detecting vehicle speed of the automotive vehicle at intervals and generating a vehicle speed indicative signal indicative of the vehicle speed detected;
    detecting opening degree of the throttle valve at intervals and generating a throttle opening degree indicative signal indicative of the opening degree of the throttle valve detected;
    executing a first routine where a first desired reduction ratio is determined based on said vehicle speed indicative signal and said throttle opening degree indicative signal and an actual reduction ratio of the continuously variable transmission is adjusted toward said first desired reduction ratio;
    repeating said first routine executing step;
    computing at intervals of a first predetermined period a difference in said throttle opening degree indicative signal over each of said intervals and generating a difference indicative signal indicative of the difference computed;
    comparing said difference indicative signal with a first reference and generating a comparison result indicative signal when said difference indicative signal attains a first predetermined relationship with said reference; and
    interrupting said first routine executing step after a predetermined condition has been satisfied, and executing a second routine where a second desired reduction ratio is determined based on said vehicle speed indicative signal and said throttle opening degree indicative signal and the actual reduction ratio of the continuously variable transmission is adjusted toward said second desired reduction ratio;
    said predetermined condition involving generation of said comparison result indicative signal.

34. A method as claimed in claim 33, wherein said second routine executing step is repeated over a second predetermined period that is longer than said first predetermined period as long as said difference indicative signal generated subsequently continues to attain a second predetermined relationship with a second reference although it fails to attain said predetermined relationship with said first reference once said first predetermined condition has been satisfied.

35. A method as claimed in claim 33, wherein said second routine executing step is repeated over a second predetermined period that is longer than said first predetermined period as long as said vehicle speed indicative signal subsequently generated continues to be greater than a predetermined value and said difference indicative signal generated subsequently continues to attain a second predetermined relationship with a second reference although it fails to attain said first predetermined relationship with said first reference once said predetermined condition has been satisfied.

36. A method as claimed in claim 33, wherein said second routine executing step is repeated over a second predetermined period that is longer than said first predetermined period as long as said vehicle speed indicative signal subsequently generated continues to be greater than a predetermined value, a brake pedal of the automotive vehicle is kept released, and said difference indicative signal generated subsequently continues to attain a second predetermined relationship with a second reference although it fails to attain said first predetermined relationship with said first reference once said predetermined condition has been satisfied.

37. A method as claimed in claim 34, wherein said first predetermined relationship with said first reference is attained when said difference indicative signal ($\Delta TH$) is greater than or equal to said first reference (A), and said second predetermined relationship with said second reference is satisfied when the sum of said difference indicative signal ($\Delta TH$) plus a predetermined value (G) is greater than or equal to zero.

38. A method as claimed in claim 37, wherein, in said difference computing step, said difference is given by subtracting said throttle opening degree indicative signal (THo) generated at the preceding interval from said throttle opening degree indicative signal (TH) generated at the subsequent interval.

39. A method as claimed in claim 38, wherein, in said first routine, said first desired reduction ratio is given by retrieval of stored data for said vehicle speed indicative signal and said throttle opening degree indicative signal, while, in said second routine, said throttle opening degree indicative signal is corrected to provide a corrected throttle opening degree indicative signal and said second reduction ratio is given by retrieval of said stored data for said vehicle speed indicative signal and said corrected throttle opening degree indicative signal.

40. A method as claimed in claim 39, wherein said corrected throttle opening degree indicative signal is given by increasing said throttle opening degree indicative signal by a value indicated by said difference indicative signal.

41. A method as claimed in claim 38, wherein, in said first routine, said first desired reduction ratio is given by retrieval of stored data for said vehicle speed indicative signal and said throttle opening degree indicative signal, while, in said second routine, said throttle opening degree indicative signal is corrected to give a corrected throttle opening degree indicative signal and said vehicle speed indicative signal is corrected to give a corrected vehicle speed indicative signal, and said second desired reduction ratio is given by retrieval of said stored data for said corrected throttle opening degree indicative signal and said corrected vehicle speed indicative signal.

42. A method as claimed in claim 37, wherein, in said first routine, said first desired reduction ratio is given by retrieval of a stored data for said vehicle speed indicative signal and said throttle opening degree indicative signal, while, in said second routine, said first desired reduction ratio is given by retrieval of said stored data for said parameter set inclusive of said throttle opening degree indicative signal, and then said second desired reduction ratio is determined by correcting said first desired reduction ratio.

43. A method as claimed in claim 38, wherein, in said first routine said first desired reduction ratio is determined by retrieval of stored data for said throttle opening degree indicative signal and said vehicle speed indicative signal while, in said second routine, said second reduction ratio is determined by retrieval of different stored data for said throttle opening degree indicative signal and said vehicle speed indicative signal.

44. A method as claimed in claim 33, wherein said second routine executing step is repeated over a second predetermined period that is longer than said first predetermined period as long as said throttle opening degree indicative signal generated subsequently continues to be less than or equal to a predetermined value once said predetermined condition has been satisfied.

45. A method as claimed in claim 44, wherein said predetermined relationship with first said reference is attained when said difference indicative signal ($\Delta$TH) is greater than or equal to said first reference (A).

46. A method as claimed in claim 45, wherein, in said difference computing step, said difference is given by subtracting said throttle opening degree indicative signal (THo) generated at a subsequent interval from said throttle opening degree indicative signal generated at the preceding interval.

47. A method as claimed in claim 46, wherein, in said first routine, said first desired reduction ratio is given by retrieval of stored data for said vehicle speed indicative signal and said throttle opening degree indicative signal, while, in said second routine, said vehicle speed indicative signal is corrected to provide a corrected vehicle speed indicative signal that is equal to said vehicle speed indicative signal generated when said predetermined condition has been satisfied, and said second desired reduction ratio is given by retrieval of said stored data for said corrected vehicle speed indicative signal that is fixed and said throttle opening degree indicative signal that is less than or equal to said predetermined value (THiDLE), whereby said second desired reduction ratio given when said predetermined condition has been satisfied is kept over said second predetermined period as long as said throttle opening degree indicative signal generated subsequently is less than said predetermined value once said predetermined condition has been satisfied.

48. A method as claimed in claim 46, wherein, in said first routine, said first desired reduction ratio is determined by retrieval of stored data for said vehicle speed indicative signal and said throttle opening degree indicative signal, while in said second routine, said second desired reduction ratio is kept indicating an actual reduction ratio established by the continuously variable transmission when said predetermined condition has been satisfied.

49. A method as claimed in claim 48, wherein, in said second routine, a computation is made at intervals of a difference in said vehicle speed indicative signal over each of said intervals so as to generate a vehicle speed difference indicative signal indicative of the difference computed, an actual reduction ratio (NB=f(iL)) is detected which is established when said predetermined condition has been satisfied and an actual reduction ratio indicative signal indicative of the actual reduction ratio detected is generated, and said actual reduction ratio is adjusted, in such a manner as to decrease said vehicle speed difference indicative signal to give a corrected actual reduction ratio indicative signal, and said second desired reduction ratio is given by said corrected actual reduction ratio indicative signal.

* * * * *